US009874113B2

(12) United States Patent
Hirson et al.

(10) Patent No.: US 9,874,113 B2
(45) Date of Patent: Jan. 23, 2018

(54) SYSTEM AND METHOD FOR REUTILIZING $CO_2$ FROM COMBUSTED CARBONACEOUS MATERIAL

(71) Applicant: Powerdyne, Inc., Newport Beach, CA (US)

(72) Inventors: Geoffrey Hirson, Newport Beach, CA (US); Gus F. Shouse, Newport Beach, CA (US)

(73) Assignee: POWERDYNE, INC., Newport Beach, CA (US)

( * ) Notice: Subject to any disclaimer, the term of this patent is extended or adjusted under 35 U.S.C. 154(b) by 400 days.

(21) Appl. No.: 14/733,588

(22) Filed: Jun. 8, 2015

(65) Prior Publication Data
US 2015/0292736 A1 Oct. 15, 2015

Related U.S. Application Data

(63) Continuation of application No. 13/100,160, filed on May 3, 2011.
(Continued)

(51) Int. Cl.
*F23J 11/00* (2006.01)
*F01K 21/04* (2006.01)
(Continued)

(52) U.S. Cl.
CPC .............. *F01K 21/04* (2013.01); *F01K 7/16* (2013.01); *F01K 7/38* (2013.01); *F01K 25/00* (2013.01);
(Continued)

(58) Field of Classification Search
CPC .............. F23J 15/04; C10J 2300/1238; C10J 2300/0946; C10J 3/18; C10J 2300/0959;
(Continued)

(56) References Cited

U.S. PATENT DOCUMENTS 3,075,065 A    1/1963   Ducati et al.
3,979,205 A    9/1976   Wanzenberg
(Continued)

FOREIGN PATENT DOCUMENTS

CA    2379892 A1    2/2001
CN    1268550 A    10/2000
(Continued)

OTHER PUBLICATIONS

"C-17 flight uses synthetic fuel blend," (Oct. 25, 2007), Wright-Patterson Air Force Base, Retrieved Feb. 7, 2008, http://www.wpatb.af.mil/news/story.asp?id=123073170.
(Continued)

*Primary Examiner* — Jason Lau
(74) *Attorney, Agent, or Firm* — Pepper Hamilton LLP

(57) ABSTRACT

A system for generating steam supplies of coal another material to one or more processing chambers. Each processing chamber includes a plasma arc torch that heats the material in the presence of water and a treatment gas at an extremely high temperature. A product gas stream is delivered from each processing chamber to a heat recovery steam generator (HRSG). Each HRSG generates steam that is used to drive a steam turbine. The processing chambers and HRSGs are fluidly connected so that the product gas streams moves from a processing chamber, to a HRSG, to another processing chamber, and then to another HRSG, etc. Within any of the HRSGs, or after the final HRSG, water in the product gas may condense to liquid water that may be redirected to any of the processing chambers. In addition, $CO_2$ from the final HRSG may be redirected into any of the processing chambers to facilitate further reactions in the chambers.

6 Claims, 16 Drawing Sheets

Related U.S. Application Data

(60) Provisional application No. 61/330,729, filed on May 3, 2010.

(51) Int. Cl.

| | | |
|---|---|---|
| *F01K 25/00* | (2006.01) | |
| *F22B 1/00* | (2006.01) | |
| *F22B 1/28* | (2006.01) | |
| *H02K 7/18* | (2006.01) | |
| *F23J 15/04* | (2006.01) | |
| *F01K 7/16* | (2006.01) | |
| *F01K 7/38* | (2006.01) | |
| *F22B 1/18* | (2006.01) | |
| *F23G 5/08* | (2006.01) | |
| *F23G 5/16* | (2006.01) | |
| *F23G 5/46* | (2006.01) | |
| *F23G 7/06* | (2006.01) | |
| *F23G 7/10* | (2006.01) | |
| *F23J 15/02* | (2006.01) | |
| *F23J 15/06* | (2006.01) | |
| *F23L 7/00* | (2006.01) | |

(52) U.S. Cl.
CPC .................. *F22B 1/00* (2013.01); *F22B 1/18* (2013.01); *F22B 1/281* (2013.01); *F23G 5/085* (2013.01); *F23G 5/16* (2013.01); *F23G 5/46* (2013.01); *F23G 7/061* (2013.01); *F23G 7/10* (2013.01); *F23J 15/025* (2013.01); *F23J 15/04* (2013.01); *F23J 15/06* (2013.01); *F23L 7/002* (2013.01); *F23L 7/007* (2013.01); *H02K 7/1823* (2013.01); *F23G 2206/203* (2013.01); *F23J 2215/20* (2013.01); *F23J 2215/50* (2013.01); *F23J 2217/101* (2013.01); *F23J 2219/40* (2013.01); *Y02E 20/12* (2013.01); *Y02E 20/344* (2013.01); *Y02E 20/363* (2013.01)

(58) Field of Classification Search
CPC ........ C10J 2300/1606; C10J 2300/1675; C10J 2300/1687; C10J 3/00; F23G 2204/201; F23G 2206/203; F23G 2202/101; F23G 2209/14; F23G 2900/00001
USPC .......................... 110/345; 60/772, 780; 48/73
See application file for complete search history.

(56) References Cited

U.S. PATENT DOCUMENTS

| | | |
|---|---|---|
| 4,466,807 A | 8/1984 | Santen et al. |
| 4,508,040 A | 4/1985 | Santen et al. |
| 4,591,428 A | 5/1986 | Pronk |
| 4,770,109 A | 9/1988 | Schlienger |
| 4,831,944 A | 5/1989 | Durand et al. |
| 4,845,334 A | 7/1989 | Stocks et al. |
| 4,898,748 A | 2/1990 | Kruger, Jr. |
| 5,046,144 A | 9/1991 | Jensen |
| 5,107,517 A | 4/1992 | Lauren |
| 5,136,137 A | 8/1992 | Schlienger |
| 5,138,959 A | 8/1992 | Kulkarni |
| 5,288,969 A | 2/1994 | Wong et al. |
| 5,301,620 A | 4/1994 | Nagel et al. |
| 5,319,176 A | 6/1994 | Alvi et al. |
| 5,493,578 A | 2/1996 | Fukusaki et al. |
| 5,534,659 A | 7/1996 | Springer et al. |
| 5,541,386 A | 7/1996 | Alvi et al. |
| 5,544,597 A | 8/1996 | Camacho |
| 5,611,947 A | 3/1997 | Vavruska |
| 5,634,414 A | 6/1997 | Camacho |
| 5,666,891 A | 9/1997 | Titus et al. |
| 5,673,635 A | 10/1997 | Fowler |
| 5,725,616 A | 3/1998 | Lynum et al. |
| 5,798,496 A | 8/1998 | Eckhoff et al. |
| 5,868,027 A | 2/1999 | Norton et al. |
| 5,935,293 A | 8/1999 | Detering et al. |
| 5,958,264 A | 9/1999 | Tsantrizos et al. |
| 6,127,645 A | 10/2000 | Titus et al. |
| 6,153,852 A | 11/2000 | Blutke et al. |
| 6,173,002 B1 | 1/2001 | Robert |
| 6,187,226 B1 | 2/2001 | Detering et al. |
| 6,215,678 B1 | 4/2001 | Titus et al. |
| 6,289,851 B1 | 9/2001 | Rabovitser et al. |
| 6,355,904 B1 | 3/2002 | Batdorf et al. |
| 6,372,156 B1 | 4/2002 | Kong et al. |
| 6,375,832 B1 | 4/2002 | Eliasson et al. |
| 6,505,567 B1 | 1/2003 | Anderson |
| 6,524,538 B2 | 2/2003 | Barankova et al. |
| 6,552,295 B2 | 4/2003 | Markunas et al. |
| 6,732,156 B2 | 5/2004 | Miloslavsky |
| 6,810,821 B2 | 11/2004 | Chan |
| 6,821,500 B2 | 11/2004 | Fincke et al. |
| 6,874,434 B1 | 4/2005 | Bigelow et al. |
| 6,971,323 B2 | 12/2005 | Capote et al. |
| 6,976,362 B2 | 12/2005 | Sheppard et al. |
| 6,987,792 B2 | 1/2006 | Do et al. |
| 7,070,634 B1 | 7/2006 | Wang |
| 7,097,675 B2 | 8/2006 | Detering et al. |
| 7,279,655 B2 | 10/2007 | Blutke et al. |
| 7,335,320 B2 | 2/2008 | Kindig et al. |
| 7,384,619 B2 | 6/2008 | Bar-Gadda |
| 7,576,296 B2 | 8/2009 | Fincke et al. |
| 7,622,693 B2 | 11/2009 | Foret |
| 7,674,443 B1 | 3/2010 | Davis |
| 7,832,344 B2 | 11/2010 | Capote et al. |
| 7,845,411 B2 | 12/2010 | Vinegar et al. |
| 7,981,371 B2 | 7/2011 | Meillot et al. |
| 8,129,654 B2 | 3/2012 | Lee et al. |
| 8,168,128 B2 | 5/2012 | Seely et al. |
| 8,199,790 B2 | 6/2012 | Vera |
| 8,216,433 B2 | 7/2012 | Yonesu |
| 8,252,244 B2 | 8/2012 | Capote et al. |
| 8,268,094 B2 | 9/2012 | Zurecki et al. |
| 8,277,631 B2 | 10/2012 | Eastman et al. |
| 8,303,916 B2 | 11/2012 | Collins et al. |
| 8,324,523 B2 | 12/2012 | Foret |
| 8,357,837 B2 | 1/2013 | Foret |
| 8,367,005 B2 | 2/2013 | Ikeda et al. |
| 8,475,551 B2 | 7/2013 | Tsangaris et al. |
| 8,518,162 B2 | 8/2013 | Smith et al. |
| 8,519,354 B2 | 8/2013 | Charipar et al. |
| 2002/0000085 A1 | 1/2002 | Hall et al. |
| 2002/0040889 A1 | 4/2002 | Markunas et al. |
| 2002/0151604 A1 | 10/2002 | Detering et al. |
| 2003/0029796 A1 | 2/2003 | Maekawa |
| 2003/0065042 A1 | 4/2003 | Shaw |
| 2003/0209174 A1 | 11/2003 | Chan |
| 2004/0134517 A1 | 7/2004 | Clark |
| 2004/0251241 A1 | 12/2004 | Blutke et al. |
| 2006/0053791 A1 | 3/2006 | Prentice, III |
| 2006/0060464 A1 | 3/2006 | Chang |
| 2006/0112639 A1 | 6/2006 | Nick et al. |
| 2006/0201157 A1 | 9/2006 | Villalobos |
| 2006/0233699 A1 | 10/2006 | Mills |
| 2007/0017228 A1 | 1/2007 | Surma |
| 2007/0186474 A1 | 8/2007 | Rabovitser et al. |
| 2007/0253874 A1 | 11/2007 | Foret |
| 2007/0258869 A1 | 11/2007 | Tsangaris et al. |
| 2007/0267289 A1 | 11/2007 | Jabs et al. |
| 2007/0272131 A1 | 11/2007 | Carabin et al. |
| 2008/0041829 A1 | 2/2008 | Blutke et al. |
| 2008/0083701 A1 | 4/2008 | Shao et al. |
| 2008/0147241 A1 | 6/2008 | Tsangaris et al. |
| 2008/0184621 A1 | 8/2008 | Clark |
| 2008/0202028 A1 | 8/2008 | Tsangaris et al. |
| 2008/0209807 A1 | 9/2008 | Tsangaris et al. |
| 2008/0222956 A1 | 9/2008 | Tsangaris et al. |
| 2008/0223047 A1 | 9/2008 | Oliver |
| 2008/0277265 A1 | 11/2008 | Tsangaris et al. |
| 2008/0283153 A1 | 11/2008 | Zurecki et al. |
| 2008/0283411 A1 | 11/2008 | Eastman et al. |

(56) References Cited

U.S. PATENT DOCUMENTS

| | | |
|---|---|---|
| 2008/0290322 A1 | 11/2008 | Hederer et al. |
| 2009/0038958 A1 | 2/2009 | Coyle et al. |
| 2009/0049748 A1 | 2/2009 | Day et al. |
| 2009/0133407 A1 | 5/2009 | Sawyer |
| 2009/0183430 A1 | 7/2009 | Schubert et al. |
| 2009/0188127 A1 | 7/2009 | Gorbell et al. |
| 2009/0307975 A1 | 12/2009 | Wolf |
| 2010/0050654 A1 | 3/2010 | Chiu et al. |
| 2010/0065781 A1 | 3/2010 | Brothier |
| 2010/0167139 A1 | 7/2010 | Gattis et al. |
| 2010/0229522 A1 | 9/2010 | Kingzett |
| 2010/0298449 A1 | 11/2010 | Rojey |
| 2011/0067376 A1 | 3/2011 | Tompkins et al. |
| 2011/0079171 A1 | 4/2011 | Capote et al. |
| 2011/0162523 A1 | 7/2011 | Fabbri et al. |
| 2011/0162958 A1 | 7/2011 | Cho et al. |
| 2011/0201700 A1 | 8/2011 | Lucas et al. |
| 2011/0212012 A1 | 9/2011 | McAlister |
| 2011/0286893 A1 | 11/2011 | Zimmerman et al. |
| 2012/0000115 A1 | 1/2012 | Shastri |
| 2012/0032452 A1 | 2/2012 | Kuku |
| 2012/0070347 A1 | 3/2012 | Bacon et al. |
| 2012/0090985 A1 | 4/2012 | Rabinovich et al. |
| 2012/0114877 A1 | 5/2012 | Lee |
| 2012/0121468 A1 | 5/2012 | Tsangaris et al. |
| 2013/0300121 A1 | 11/2013 | Ali et al. |

FOREIGN PATENT DOCUMENTS

| | | |
|---|---|---|
| CN | 1810938 A | 8/2006 |
| EP | 1270508 A1 | 1/2003 |
| GB | 573982 | 12/1945 |
| WO | 2001063980 A2 | 8/2001 |
| WO | WO 2005/005009 A2 | 1/2005 |
| WO | WO 2008/130260 A1 | 10/2008 |
| WO | WO 2009/156761 A2 | 12/2009 |
| WO | WO 2010/056462 A1 | 5/2010 |
| WO | WO 2011/091327 A1 | 7/2011 |
| WO | WO 2011/140080 A2 | 11/2011 |
| WO | WO 2012/039751 A2 | 3/2012 |
| WO | WO 2012/064936 A1 | 5/2012 |
| WO | WO 2012/077198 A1 | 6/2012 |
| WO | WO 2012/158797 A1 | 11/2012 |
| WO | WO 2012/177666 A1 | 12/2012 |

OTHER PUBLICATIONS

"Governor Rendell leads with innovative solution to help address PA energy needs," State of Pennsylvania. Archived from original on Dec. 11, 2008.
"PetroSA technology ready for next stage," Businessday.co.za, (May 10, 2011) Retrieved Jun. 5, 2013.
"PetroSA Wins Innovation Award," SouthAfrica.info, (Oct. 10, 2008), Retrieved Dec. 18, 2012.
"Schweitzer wants to convert Otter Creek coal into liquid fuel," (Aug. 2, 2005), *Billings Gazette*, Archived from original on Jan. 1, 2009.
"UPM-Kymmene says to establish beachhead in biodesel market," NewsRoom Finland. Archived from original on Mar. 17, 2007.
Fairley, Peter, "Growing Biofuels," (Nov. 23, 2005), MIT Technology Review.
International Search Report and Written Opinion dated Dec. 12, 2013 for International Application No. PCT/US2013/058305.
International Search Report and Written Opinion dated Feb. 24, 2015 for International Application No. PCT/US2014/069342.
International Search Report and Written Opinion dated Feb. 7, 2014 for International Application No. PCT/US2013/058301.
International Search Report and Written Opinion dated Feb. 7, 2014 for International Application No. PCT/US2013/058315.
International Search Report and Written Opinion dated Feb. 7, 2014 for International Application No. PCT/US2013/058326.
International Search Report and Written Opinion dated Jan. 16, 2014 for International Application No. PCT/US2013/058335.
International Search Report and Written Opinion dated Jan. 17, 2014 for International Application No. PCT/US2013/058287.
International Search Report and Written Opinion dated Jan. 22, 2014 for International Application No. PCT/US2013/0583331.
International Search Report and Written Opinion dated Jul. 28, 2014 for International Application No. PCT/US2014/024606.
Jamieson, Andrew, "Keeping the Options Open", *Petroleum Economist*, Retrieved LNG 2012.
Krauss, Clifford, "South African Company to Build U.S. Plant to Convert Gas to Liquid Fuels," (Dec. 3, 2012), *New York Times*.
Lane, Jim, "Little Big Tech: Can Fischer-Tropsch technology work at smaller scale?" (Nov. 20, 2012), *Biofuels Digest*.
Pitt, Anthea, "Linc gears up for Chinchilla GTL," (Nov. 28, 2012), Upstreamonline.com.
Plasco Group. http://www.plascoenergygroup.com/our-solution/how-is-plasco-different/, retrieved from web Jul. 5, 2011.
Schuey et al., LLW Processing and Operational Experience Using a Plasma ARC Centrifugal Treatment (PACT) System, WM'06 Conference, Feb. 26-Mar. 2, 2006, Tucson, AZ.
Smedley, Mark, "Small GTL's Market Reach as Great as Opec's, UK Firm Says," *World Gas Intelligence*, Retrieved Dec. 19, 2012.
Steynberg et al., "Clean Coal Conversion Options Using Fischer-Tropsch Technology," (2003), Fuel Chemistry Division Preprints, 48(1); 459-461.
Urashima et al., "Removal of volatile organic compounds from air streams and industrial flue gases by non-thermal plasma technology," *IEEE Transactions on Dielectrics and Electrical Insulation*, Oct. 2000, vol. 7, Iss. 5, Accessed on: Dec. 24, 2012.
Supplemental European Search Report for EP13836174 dated Mar. 31, 2016.
Supplemental European Search Report for EP 13834468 dated Mar. 31, 2016.
Supplemental European Search Report for EP 13835933 dated Mar. 31, 2016.
Supplemental European Search Report for EP 13834969 dated Apr. 1, 2016.
Supplemental European Search Report for EP 13835425 dated Apr. 1, 2016.
Supplemental European Search Report for EP 13835534 dated Apr. 11, 2016.
Supplemental European Search Report for EP 13835723 dated Mar. 31, 2016.
Supplemental European Search Report for EP 14870315 dated May 9, 2017.

SYSTEM AND METHOD FOR REUTILIZING $CO_2$ FROM COMBUSTED CARBONACEOUS MATERIAL

RELATED APPLICATIONS

This application is a continuation of U.S. patent application Ser. No. 13/100,160, filed on May 3, 2011, entitled "A System and Method for Reutilizing $CO_2$ from Combusted Carbonaceous Material", which claims priority to U.S. Provisional Application No. 61/330,729 filed May 3, 2010, the entire contents of which are incorporated by reference herein.

BACKGROUND

The present disclosure relates to the generation of steam resulting from the combustion and processing of carbonaceous material for the generation of electricity and other uses.

Despite the serious problems caused by its use, coal is cheap and plentiful and will not be abandoned as an energy source any time soon. According to the Pew Center for Global Climate Change, coal use, primarily for the generation of electricity, now accounts for roughly 20 percent of global greenhouse gas emissions. Rising energy demand will continue to drive up coal consumption, particularly in countries with large reserves such as the United States, China and India. http://www.pewclimate.org/global-warming-basics/coalfacts.cfm.

Coal can provide usable energy at a cost of between $1 and $2 per MMBtu compared to $6 to $12 per MMBtu for oil and natural gas, and coal prices are relatively stable. At current consumption rates and with current technology and land-use restrictions, the U.S. coal reserves would last well over 250 years. Although coal is higher-polluting and more carbon-intensive than other energy alternatives, coal is so inexpensive that one can spend quite a bit on pollution control and still maintain coal's competitive position.

Coal plays a major role in meeting U.S. energy needs, and is likely to continue to do so in coming decades. About fifty percent of the electricity generated in the United States is from coal. U.S. coal-fired plants have over 300 GW of capacity, but approximately one-third of the U.S. coal-fired plants date from 1970 or earlier, and most of the rest from 1970-1989. Only twelve coal-fired plants have been built in the United States since 1990.

Greenhouse gas emissions from coal-fired power are significant and growing rapidly. The United States has been estimated to produce close to 2 billion tons of $CO_2$ per year from coal-burning power plants. Greenhouse gas emissions from coal-fired electricity, now 27 percent of total U.S. emissions, are projected to grow by a third by 2025.

SUMMARY

A method of generating steam comprises providing a continuous supply of coal, combusting the coal in a primary processing chamber in the presence of oxygen and water to provide a first product gas stream, recovering heat from the first product gas stream in a first heat recovery steam generator (HRSG) to produce a first steam output, processing the first product gas stream in a secondary processing chamber in the presence of oxygen and water to provide a second product gas stream substantially free of inorganic, organic and particulate contaminants, recovering heat from the second product gas stream in a second heat recovery steam generator (HRSG) to produce a second steam output, and combining the first steam output and the second steam output. The combined steam output may be used to drive a steam turbine. In certain embodiments, the steam turbine is operatively coupled to an electric generator to produce electricity. In certain embodiments, the method further comprises at least one of reducing the temperature of the second product gas stream, treating the second product gas stream by wet scrubbing, separating sulfur from the second product gas stream and collecting the sulfur with a baghouse, using a carbon dioxide recovery system, and discharging a treated gas stream substantially free of contaminants.

Other embodiments of the method comprise providing a continuous stream of thermal waste gas, recovering heat from the thermal waste gas stream in a first heat recovery steam generator (HRSG) to produce a first steam output, processing the thermal waste gas stream in a primary processing chamber in the presence of oxygen and water to provide a product gas stream, recovering heat from the first product gas stream in a second heat recovery steam generator (HRSG) to produce a second steam output, and combining the first steam output and the second steam output. In certain embodiments, the combined steam output is used to drive a steam turbine. In certain embodiments, the steam turbine is operatively coupled to an electric generator to produce electricity. In certain embodiments, the method further comprises reducing the temperature of the product gas stream, treating the product gas stream by wet scrubbing, separating sulfur from the second product gas stream and collecting the sulfur with a baghouse, and discharging a treated gas stream substantially free of contaminants.

Certain embodiments provide a system for generating steam comprising a primary processing chamber having at least one plasma arc torch, the primary processing chamber being operatively connected to a continuous carbonaceous material feed, a treatment gas source and a water source, wherein the primary processing chamber is fluidly connected to a first heat recovery steam generator that is fluidly connected to a steam turbine. In certain embodiments, the system further comprises a secondary processing chamber having at least one plasma arc torch, the secondary processing chamber being fluidly connected to the first heat recovery steam generator, a treatment gas source and a water source, wherein the secondary processing chamber is fluidly connected to a second heat recovery steam generator that is fluidly connected to the steam turbine. In some embodiments, the carbonaceous material is thermal waste gas. In some embodiments, the carbonaceous material is selected from the group consisting of coal, oil, natural gas, and oil shale, biomass, coke, petroleum coke, char, tars, wood waste, methanol, ethanol, propanol, propane, butane, and ethane. In some embodiments, the second heat recovery steam generator is fluidly connected to at least one of a quench chamber, a wet scrubber, a baghouse or a carbon dioxide removal system.

Other embodiments of the system comprise a programmable two-way valve with an input in fluid connection with the wet scrubber and two outputs, one in fluid connection with the baghouse and the other in fluid connection with the primary processing chamber, the latter configured to return at least a portion of the carbon dioxide from the effluent of the wet scrubber to the primary processing chamber. In some embodiments, process parameters are monitored by a plurality of monitors, each of said monitors providing data related to the process parameters to a processor. In certain embodiments, the process parameters comprise temperature, pressure, and carbon dioxide content. In certain embodiments, the processor controls the programmable two-way valve through an actuation mechanism via a control mechanism. In certain embodiments, the processor comprises a tangible memory containing computer readable instructions for the processor to follow.

In certain embodiments, the system further comprises a second programmable two-way valve with an input in fluid connection with the wet scrubber. In certain embodiments, the system further comprises a second programmable two-way valve with an input in fluid connection with one of the two heat recovery steam generators. In certain embodiments the second programmable two-way valve comprises two outputs, one in fluid connection with a waste water treatment and/or discharge facility and the other in fluid connection with the primary processing chamber or the primary processing chamber water source. In some embodiments, process parameters are monitored by the plurality of monitors, each of said monitors providing data related to the process parameters to a processor. In certain embodiments, the process parameters comprise temperature, and water flow rate from the primary processing chamber water source. In certain embodiments, the processor controls the second programmable two-way valve through a second actuation mechanism via a second control mechanism.

Certain embodiments provide a method of generating steam comprising providing a continuous supply of a carbonaceous material, combusting the carbonaceous material in a first processing chamber having at least one plasma arc torch in the presence of oxygen and water to provide a first product gas stream; recovering heat from the first product gas stream in a first heat recovery steam generator to produce a first steam output; processing the first product gas stream in a second processing chamber having at least one plasma arc torch in the presence of oxygen and water to provide a second product gas stream substantially free of carbon monoxide and hydrogen, recovering heat from the second product gas stream in a second heat recovery steam generator to produce a second steam output; and using the first steam output and the second steam output. Typically, method comprises using the first steam output and the second steam output to operate a steam turbine. In some embodiments, the first steam output and the second steam output operate a steam turbine operatively connected to an electric generator to produce electricity.

In certain embodiments, the method comprises one or more of the steps of quenching the second product gas, processing the second product gas with a wet scrubber, processing the second product gas with a baghouse, and processing the second product gas with a carbon dioxide removal system.

In certain embodiments, the method further comprises diverting at least a portion of the carbon dioxide in the second product gas to the primary processing chamber via a programmable two-way valve. In some embodiments, the programmable two-way valve is under process control via a control mechanism that is actuated by a processor. In some embodiments, the processor comprises a tangible memory containing computer readable instructions for the processor to follow. In some embodiments, the process control is based at least in part on data supplied to the processor by a plurality of monitors, each of said monitors providing data related to at least one of a plurality of process parameters. In some embodiments, the process parameters comprise pressure, temperature, and carbon dioxide content in a product gas.

In certain embodiments, the method further comprises diverting at least a portion of the water in the second product gas to the primary processing chamber or to the primary processing chamber water source via a second programmable two-way valve. In some embodiments, the method further comprises diverting at least a portion of the water from either of the two heat recovery steam generators to the primary processing chamber or to the primary processing chamber water source via a second programmable two-way valve. In some embodiments, the second programmable two-way valve is under process control via a second control mechanism that is actuated by the processor. In some embodiments, the process control is based at least in part on data supplied to the processor by the plurality of monitors, each of said monitors providing data related to at least one of the plurality of process parameters. In some embodiments, the process parameters comprise pressure, temperature, and water flow from the water source to the primary processing chamber.

BRIEF DESCRIPTION OF THE DRAWINGS

The foregoing and other objects, features and advantages of the disclosure will be apparent from the following more particular description of various embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION

Figure 1:
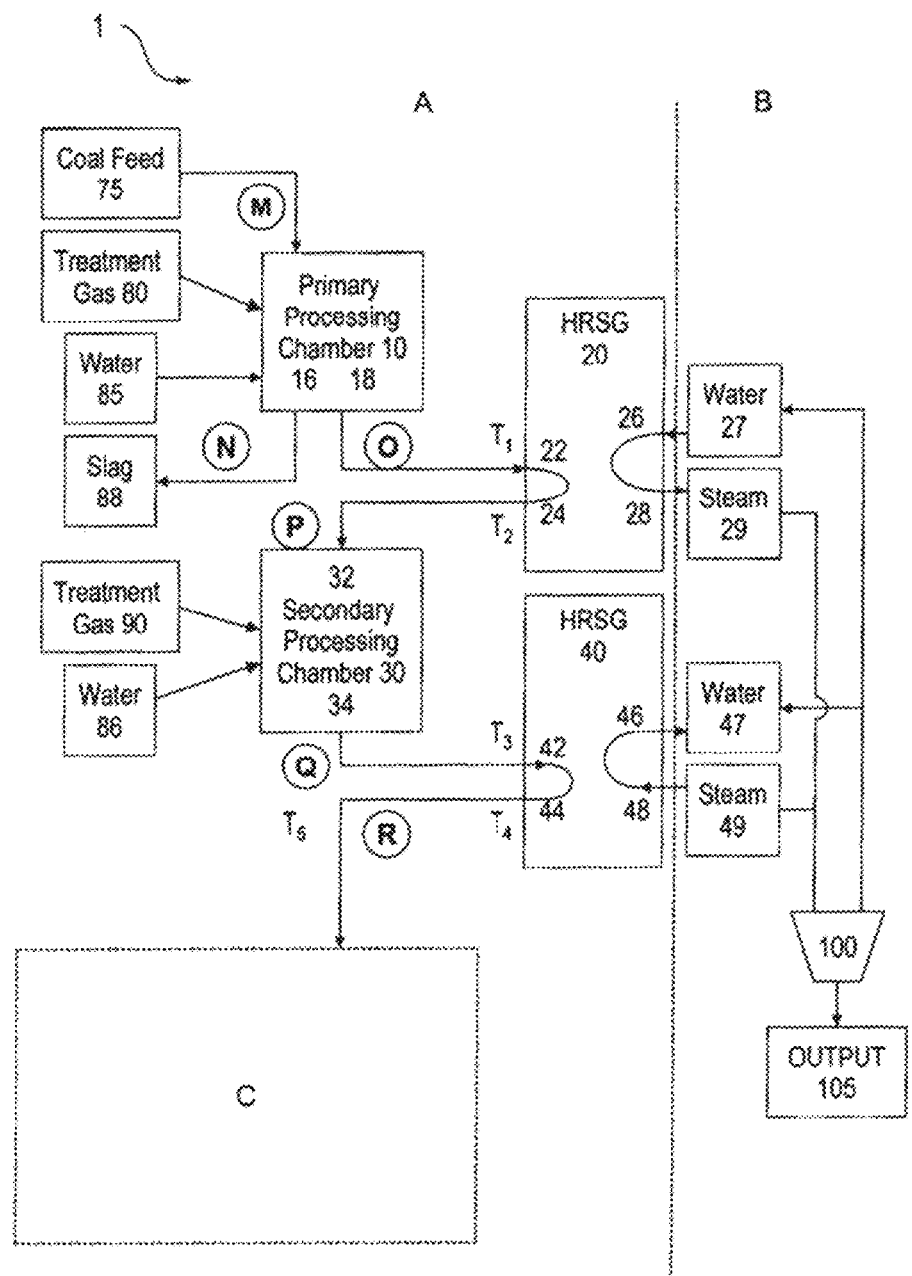
FIG. 1 is a flow-chart showing an exemplary embodiment of a system according to the present disclosure having two heat recovery steam generators ("HRSGs").

The present disclosure is directed to a method and system for generating steam from coal for the generation of electricity and other uses. The term "coal," as used herein, is intended to refer to any carbonaceous feedstock, such as wood chips or organic waste, of adequate carbon density. As used herein, the term "carbonaceous material" refers to any solid, liquid or gaseous carbon-containing material suitable for use as a fuel, i.e. a material which can be combusted to produce energy. Included within the scope of this term are fossil fuels, including coal, oil, natural gas, and oil shale, biomass, i.e. plant materials and animal wastes used as fuel, coke, petroleum coke ("petcoke"), char, tars, wood waste, thermal waste gas, methanol, ethanol, propanol, propane, butane, ethane, etc. In certain embodiments, the coal is a bituminous coal.

This disclosure is not limited to the particular methodologies, systems and materials described, as they may vary. Also, the terminology used in the description is for the purpose of describing the particular versions or embodiments only, and is not intended to limit the scope. For example, as used in this document, the singular forms "a," "an," and "the" include plural references unless the context clearly dictates otherwise. The word "comprising" as used herein is intended to mean "including but not limited to." Unless defined otherwise, all technical and scientific terms used herein have the same meanings as commonly understood by one of ordinary skill in the art.

According to the system and method of the present disclosure, coal is combusted in the presence of oxygen and water and to generate a hot product gas stream, from which heat is extracted to produce steam for uses including, but not limited to, driving a turbine operatively linked to an electric generator for the production of electricity. After the heat is extracted, the product gas stream is treated to remove the majority of contaminants. This treatment produces a "clean" carbon dioxide stream that meets Environmental Protection Agency ("EPA") emission regulations, and can be used, for example, in chemical processes, for EPA approved sequestration, and the like.

The disclosed apparatus and method of operation enable combustion at very high temperatures for the direct and efficient exploitation of the heat produced to generate steam and the processing of the combustion products enabling efficient and convenient management of environmentally unfriendly byproducts of the combustion.

The method includes providing a continuous supply of coal, combusting the coal in a primary processing chamber (PPC) that provides circulation of gaseous reactants, recovering the heat that is the result of the combustion in a heat recovery steam generator (HRSG) to produce high-pressure steam. Complete combustion of the coal is accomplished by combining the coal with oxygen and water in a high-temperature plasma reactor.

Processes for gasifying coal to produce synthetic gas ("syngas") are known. The purpose of such gasification processes is to increase or at least maintain the caloric content of the syngas relative to the coal starting material. The syngas is then burned for generate steam to drive a turbine, for electricity generation. However, in the method of the present invention, instead of burning the product gas that results from the combustion of coal in the presence of oxygen and water, the heat from the product gas is used to convert water to steam, which in turn is used, in some embodiments, to drive a turbine operatively linked to an electric generator to produce electricity.

Embodiments of the method may include multiple stages through which the product gas stream passes sequentially, with each stage comprising a processing chamber or reactor and a heat recovery steam generator (HRSG), with the HRSG downstream relative to the processing chamber. The product gas output from the final (furthest downstream) HRSG is processed through further steps comprising quenching, wet scrubbing and baghouse filtration, as needed, which result in a gas stream that is suitable for convenient management. Equipment for the practice of the disclosed method is commercially available from several suppliers. In certain embodiments, a suitable processing chamber or reactor is a plasma-arc centrifugal treatment ("PACT") system built by Retech Systems LLC (Ukiah, Calif.), and a suitable heat recovery steam generator (HRSG) system is built by NEM Standard Fasel (Hengelo, Netherlands), and/or others.

Various embodiments of the systems and methods of the present disclosure can process coal in a continuous stream instead of batches, efficiently extract heat from the gas produced by the combustion of the coal in the presence of oxygen and water to create steam to drive a stream turbine, require about fifty (50%) percent less coal than other coal fired power plants to achieve similar electrical power levels; remove contaminant efficiently removal from gas streams, produce and capture a clean carbon dioxide stream ready for EPA approved sequestration.

Embodiments of the system and method will now be described with reference to the Figures. FIG. 1 is a flowchart illustrating one exemplary system 1 comprising a combustion section A operatively connected to a power generating section B and a gas decontamination section C.

As shown, combustion section A comprises a primary processing chamber 10 ("PPC 10"), first heat recovery steam generator 20 ("first HRSG 20"), a secondary processing chamber 30 ("SPC 30"), a second HRSG 40. In certain embodiments, the gas decontamination section C comprises one or more of the following components: a quench chamber 50, a baghouse 70, a wet scrubber 60, and a $CO_2$ removal system 120, all fluidly connected. A source of a treatment gas 80, 90 (such as $O_2$), and source of water 85, 86, are both fluidly connected to each of the primary and secondary processing chambers 10, 30, respectively. The treatment gas 80 and the treatment gas 90 may be the same or different. In certain embodiments, treatment gas 80 and treatment gas 90 comprise 93-95% oxygen and 5-7% argon.

The PPC 10 receives a continuous coal feed 75 as well as the treatment gas input 80 and water input 85, and outlets 16 and 18 for slag and gas, respectively. The PPC 10 is capable of withstanding the processing conditions (i.e., temperature, pressure, corrosion, and the like) under which the combustion of coal in the presence of oxygen and water takes place.

One exemplary system is a plasma arc centrifugal treatment (PACT) system available from Retech Systems, LLC, in Ukiah, Calif., which comprise at least one plasma arc torch. For ease of discussion, the terms "torch" or "torches" will be used hereinafter to refer to plasma arc torches. The torches are capable of reaching temperatures ranging of up to about 10,000° F. to about 20,000° F. (about 5,540° C. to about 11,080° C.), or more. In various embodiments, the PPC may rotate to facilitate distribution of the combustion materials to the torch in the chamber.

Figure 11A:
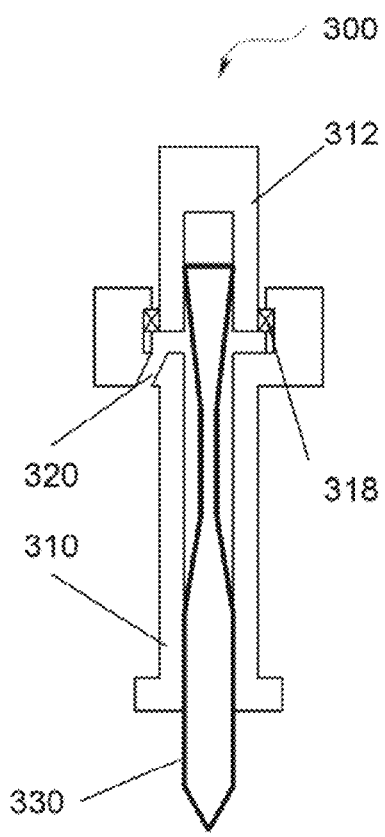
FIGS. 11A and 11B are schematic diagrams of a non-transferred mode plasma arc torch, and a transferred mode plasma arc torch.
Figure 11B:
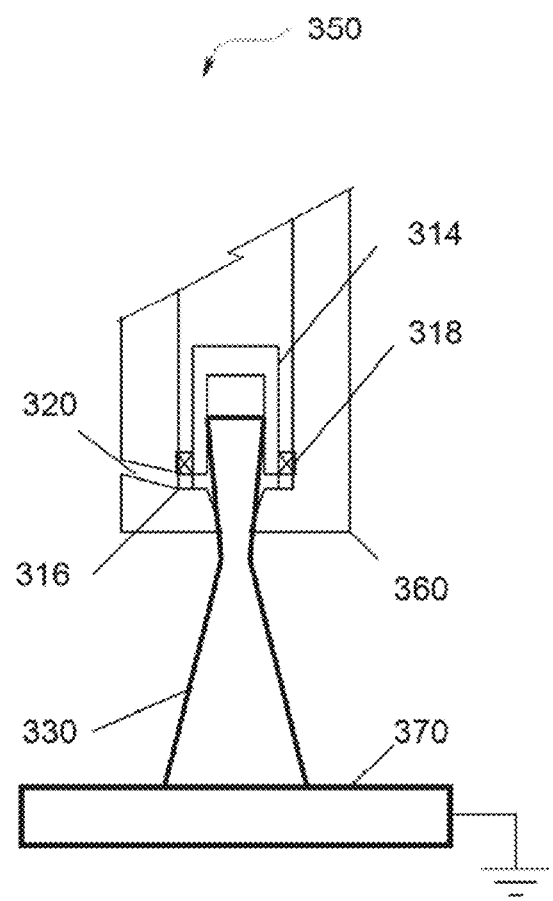

There are two types of plasma torches differing in their structure and the mode in which they operate, as shown in FIGS. 11A and 11B. The first, a transferred-arc torch, is effective at heating the work piece, and operates by drawing the arc between the torch and the work piece (the molten slag) with the work piece acting as the cathode. The second, a non-transferred-arc torch, is especially effective in heating the gas. In non-transferred-arc torches, the torch houses both the anode and the cathode, and the cathode is downstream of the anode. In operation, the arc is drawn within the torch, and the plasma extends beyond the end of the torch as a result of high gas flow through the torch, even though the electrodes are inside the torch. One exemplary PACT system comprises one or more non-transferred arc plasma torches fitted with gas backflow collars.

In certain embodiments, the method involves continuously introducing coal into the PPC 10, with the treatment gas 80 simultaneously supplied to chamber 10 at a predetermined flow rate and concentration to ensure complete combustion of the coal, while the chamber rotates and the torches heat both the coal and the treatment gas contained in the chamber. The ability to feed and operate the process continuously is an important virtue, improving both efficiency and the continuity of the output electrical power.

In embodiments of the present method, the torches contact the coal, and are operated at a temperature sufficient to induce the spontaneous combustion of the coal, which is about 10,000° F. (about 5,540° C.), and at this temperature we take all elements to their molecular state. The temperature in PPC 10 may be sustained by minimal energy input from the coal.

Optionally, the concentration of oxygen supplied to PPC 10 may be used to regulate and maintain the ratio of CO to $CO+CO_2$ in a desirable range, e.g., between about 20% and about 45%, which prevents or minimizes the formation of soot. Also optionally, water 85 may be added to the gas flow to maintain the temperature of the gas discharged from the PPC 10 within a desired temperature range, e.g., from about 2,000° F. (about 1,100° C.) to about 2,400° F. (about 1,300° C.), or higher, up to the practical limit of the highest temperature that the downstream equipment can withstand.

During combustion of the coal in the PPC 10, about ninety percent (90%) of the ash components of the coal are melted down into a glassy slag 88 by the torches, and the remainder becomes inorganic particulates entrained in the gas stream. The ash combustion product may not be electrically conducting until it is melted. To effect the required melting, a dual-mode plasma torch may be operated initially in non-transferred-arc mode until the work piece is molten and conducting, and then switched to non-transferred mode. The plasma gas may be introduced tangentially so as to produce swirl, thereby stabilizing the flow.

In certain embodiments, the PPC 10 is configured to produce mixing of the coal feed 75, treatment gas 80 and water 85 to facilitate complete combustion. The slag resulting from combustion of the ash is melted and collects at the bottom of the PPC 10, which acts as a crucible. In certain embodiments, the crucible is rotated as, in, or by a centrifuge. The rotation serves to distribute heat from the torch over the molten slag and to hold, by centrifugal force, the molten slag away from the axis of rotation. Rotation of the crucible allows the slag to be removed from the bottom of the crucible by slowing its rotation. When sufficient slag has accumulated in the processing chamber it is removed, cooled and allowed to solidify in a shape convenient for disposal or use as building material. Any heavy metals present in the slag are locked in the leach-resistant glassy slag. An air lock may be used to remove the slag mold and the slag therein.

During the combustion of coal in PPC 10, certain chemicals and contaminants may be present or formed. If desired or necessary, the PPC 10 may be maintained at a negative pressure of, for example, about 25 to 50 mbar, to prevent release of contaminants from the PPC. Accordingly, the hot gas stream may comprise, for example, gases such as carbon monoxide (CO), carbon dioxide ($CO_2$), hydrogen ($H_2$), and combinations of the foregoing; as well as toxic and/or environmentally hazardous compounds such as nitrogen oxides ("$NO_x$"), sulfur oxides ("$SO_x$"), dioxin, polychlorinated dibenzodioxins ("dioxins"), dioxin-like compounds ("DLCs"), polychlorinated dibenzofurans ("furans"), polychlorinated biphenyls ("PCBs"), volatile organic compounds ("VOCs") acids, (e.g., hydrochloric acid (HCl), nitric acid ($HNO_3$), sulfuric acid ($H_2SO_4$), and the like), and combinations of the foregoing. The majority of these chemicals and contaminants that are formed during combustion are destroyed after formation during the typically 2 second residence time in the primarily processing chamber 10.

After combustion of the coal in PPC 10, the resulting gas stream O is discharged into first HRSG 20. No produced gas is vented to the atmosphere from the PPC, but instead all gas is delivered to the HRSG. The HRSGs are capable of receiving the hot gas stream from the PPCs without suffering appreciable degradation. That is, the HRSGs are capable of withstanding the temperature, pressure, corrosive chemicals, and the like, to which they may be subjected when contacting the hot gas. To assist in accommodating the elevated temperatures, it may be beneficial to line portions of the HRSG with ceramic. One exemplary HRSG is a heat-recovery boiler manufactured by NEM (Leiden, the Netherlands). The first HRSG 20 includes an inlet 22 for receiving the contaminant-containing gas stream O (hereinafter "gas stream O") discharged from the PPC 10 at a first temperature $T_1$, and an outlet 24 for discharging gas stream O into the SPC 30 at a temperature $T_2$ that is lower than $T_1$. In the first HRSG 20, heat is extracted from gas stream O using a heat exchanger for later use in electricity production, discussed in greater detail below. The amount of heat available for exchange in the first HRSG can vary depending upon various factors including, but not limited to, the configuration of the system, the size of the PPC 10, the rate of coal input, and the processing conditions in PPC 10.

The SPC 30, like the PPC 10, is capable of withstanding the processing conditions (i.e., temperature, pressure, corrosion, and the like) to which it is subjected, and further is adapted to remove any contaminants remaining after combustion of the coal in the PPC 10. One example of such a system for treating the gas stream P is the PACT system as discussed above.

SPC 30 is operated in the same manner as PPC 10. The treatment gas 90 and optionally water 95 are simultaneously supplied to SPC 30 at a predetermined flow rate and concentration, while the gas stream P flows into the chamber inlet 32 from the outlet 24 of the first HRSG 20, and the torches heat the gas. An SPC residence time of two seconds is estimated to suffice for the completion of combustion. The addition of water in the SPC 30 to the gas stream can be used to maintain and/or control the temperature of the gas in the SPC 30. In some embodiments, it may be desirable to maintain a temperature of about 2,400° F. to about 2,900° F. (about 1,300° C. to about 1,600° C.).

In SPC 30, treatment gas 90 can react with certain contaminants in the waste stream to produce a treated gas stream Q from which dioxins, furans, the majority of $NO_x$, and the majority of particulate matter (e.g., ash) suspended in the gas stream P have been removed, as well as non-toxic reaction products and/or by-products. See Examples 1-5, below. For example, during treatment in SPC 30, any remaining carbon monoxide and hydrogen in the gas stream P are converted to carbon dioxide and water vapor. Compared the chemical compositions of gas streams P and Q in Tables 3-5, 7 and 8, below. Such a conversion is accompanied by the release of the remaining chemical energy stored in the gas, and may be assisted by the addition of oxygen to the gas. The auto-ignition temperature for CO is about 1,100° F. (about 593° C.). Therefore, it may be desirable to use a spark or flame in the SPC 30 to initiate combustion. A non-transferred plasma torch may be used for this purpose.

After treatment in SPC 30, treated gas Q, at temperature $T_3$, is discharged into the inlet 42 of the second HRSG 40. Second HRSG 40 is fluidly connected to the outlet 34 of SPC 30, and is adapted to receive treated gas stream Q and to discharge the treated gas stream R, at a fourth temperature $T_4$, lower than $T_3$, into the inlet 52 of quench chamber 50. Similar to PPC 10, and depending upon various factors including, but not limited to, the configuration of the system, the size of the PACT system, the rate of coal input, and the processing conditions in SPC 30, the amount of heat available for exchange in the second HRSG may vary.

Optionally, one or more additional HRSGs (not illustrated) may be used sequentially with the HRSGs 20 and 40 to capture any residual waste heat from the gas stream R. Optionally, the system may comprise one or more additional HRSGs (not illustrated) used sequentially with the primary HRSG 20, all of which perform the same function, which is the transfer of heat from the gas stream to the water circulation in the HRSG. In embodiments employing multiple HRSGs, heat may be extracted at different points along the gas stream. For example, the system comprises two HRSGs 20 and 40; the first HRSG 20 extracts heat from the gas stream O as it is discharged from the PPC 10. At this point O, the gas stream contains some corrosive and toxic contaminants; see Examples 1-5, below. The second HRSG 40 extracts heat from the gas stream Q as it is discharged from the SPC 30.

Figure 3:
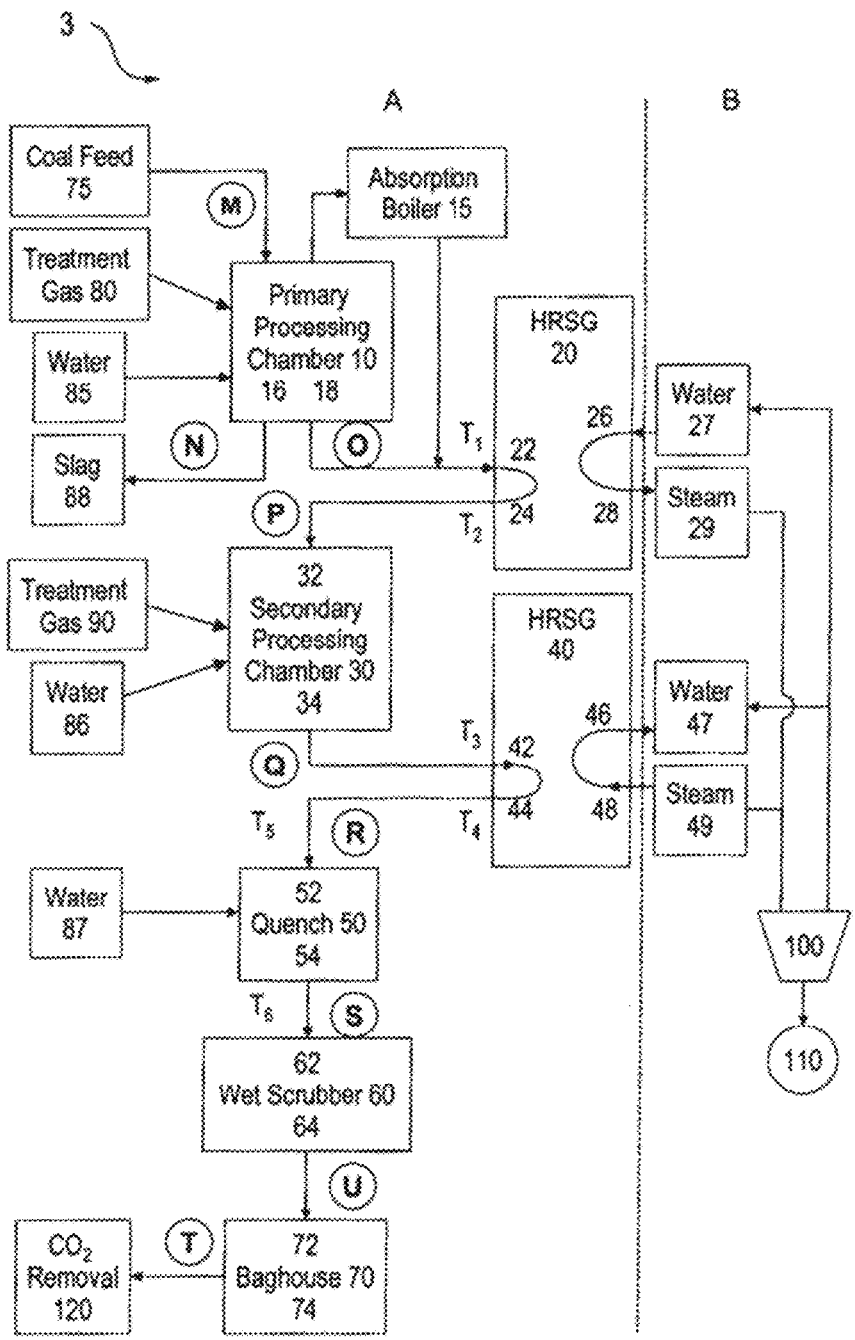
FIG. 3 is a flow-chart showing an alternative exemplary embodiment of the systems of FIGS. 2A and B further comprising an absorption boiler.

The HRSGs employed in a multiple-HRSG embodiment may differ from one another. For example, HRSGs 20 and 40 may differ significantly in the density of corrosive and toxic components to which they are subjected, and the HRSGs may have different construction to withstand such differences. When the operating temperature of the processing chamber exceeds the maximum temperature the HRSG can accommodate, FIG. 3 illustrates an embodiment in which an additional heat sink, such as an absorption boiler 15, may be introduced to extract heat from the gas stream between the primarily processing chamber 10 and the HRSG 20. The gas stream resulting from any additional HRSGs is discharged into either the SPC 30 or the quench chamber 50, if needed, depending upon their position. Additional processing chambers and additional heat exchangers may be added either serially or in parallel.

Figure 2A:
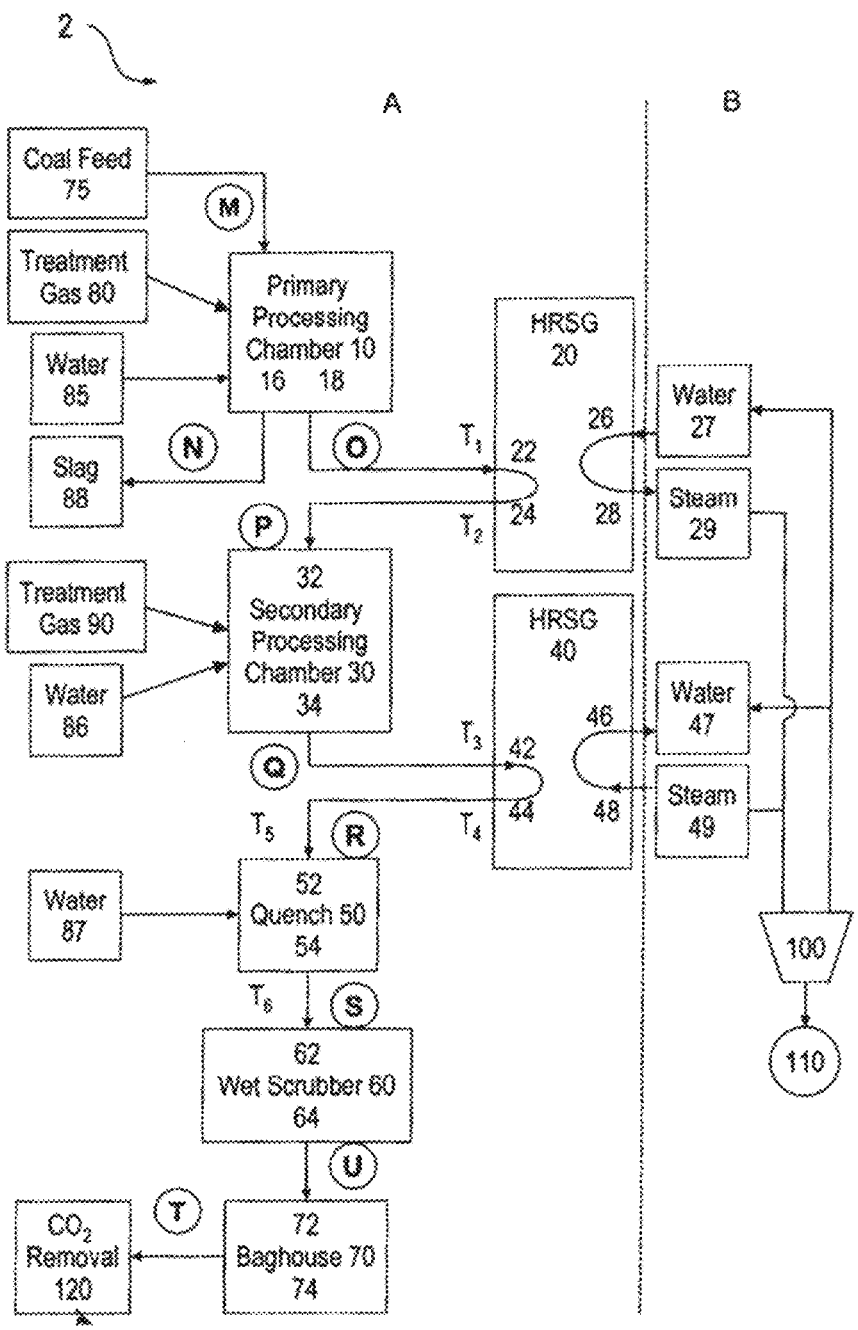
FIGS. 2A-C are flow-charts showing alternative exemplary embodiments of the system of FIG. 1 further comprising an electric generator, a quench chamber, a wet scrubber, a carbon dioxide recycling system, and a water recycling system.
Figure 4:
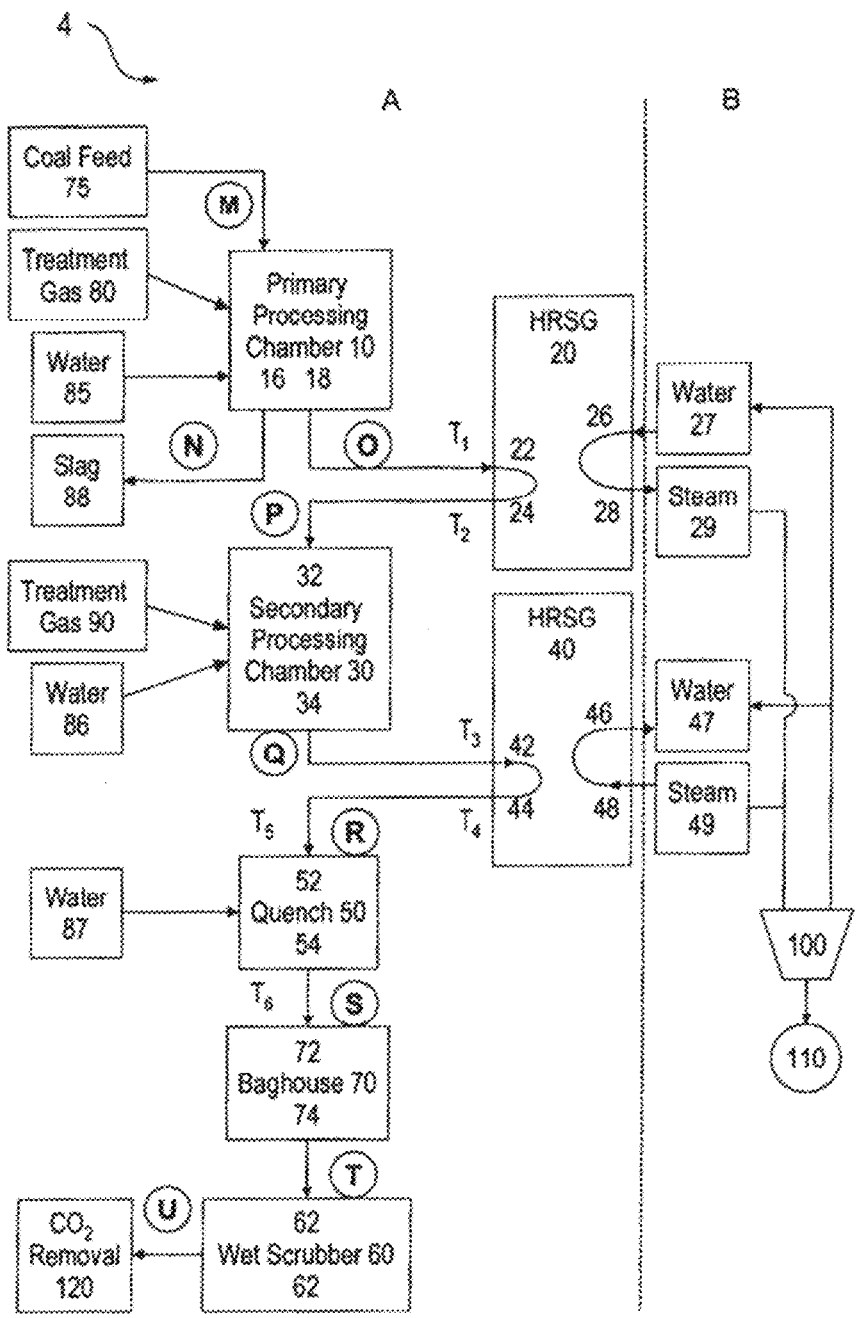
FIG. 4 is a flow-chart showing an alternative exemplary embodiment of the systems of FIGS. 2A-C in which the baghouse is upstream of the wet scrubber.
Figure 5:
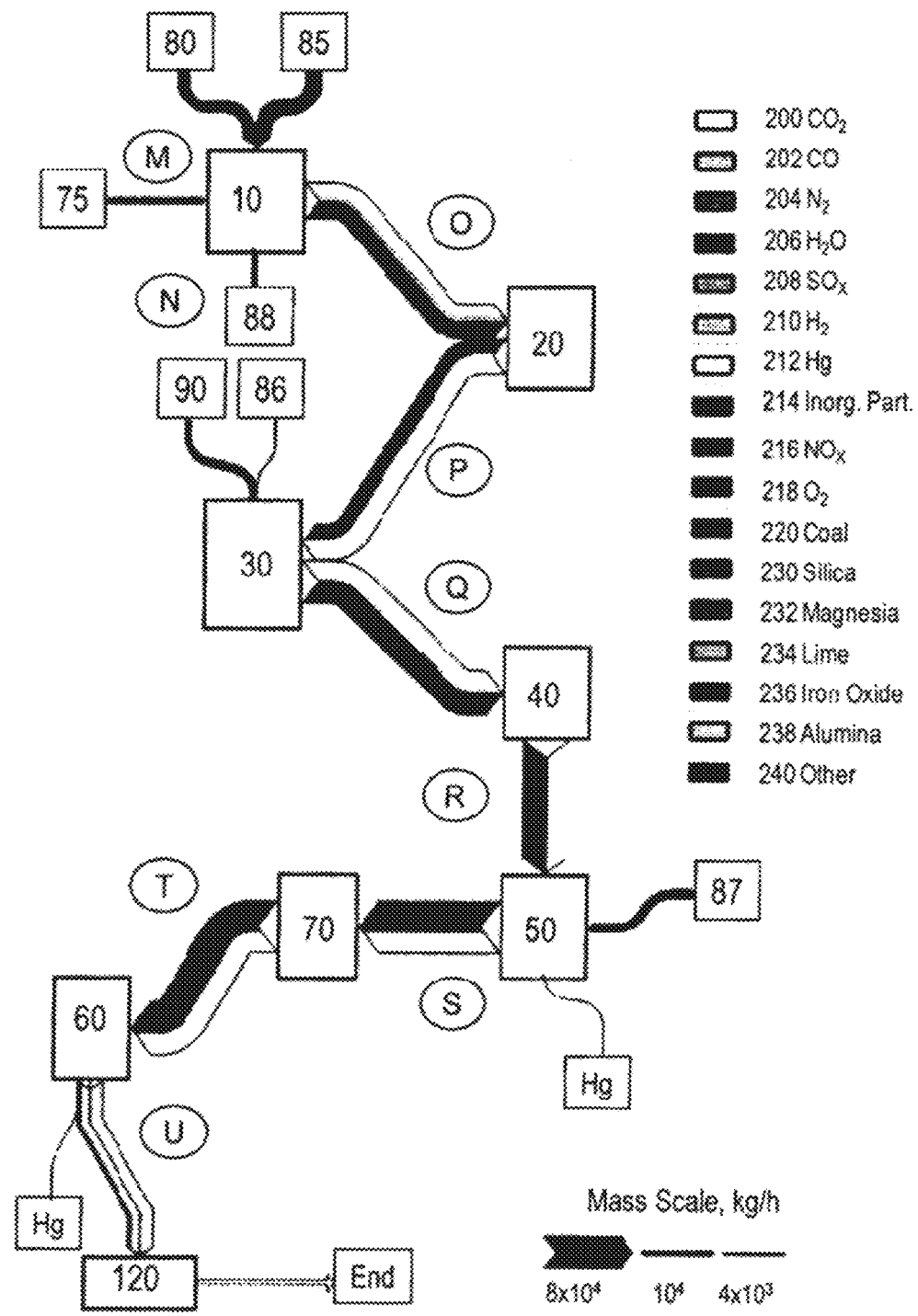
FIG. 5 shows a Sankey diagram for one exemplary baseline two-HRSG embodiment of a system according to the present disclosure.
Figure 6:
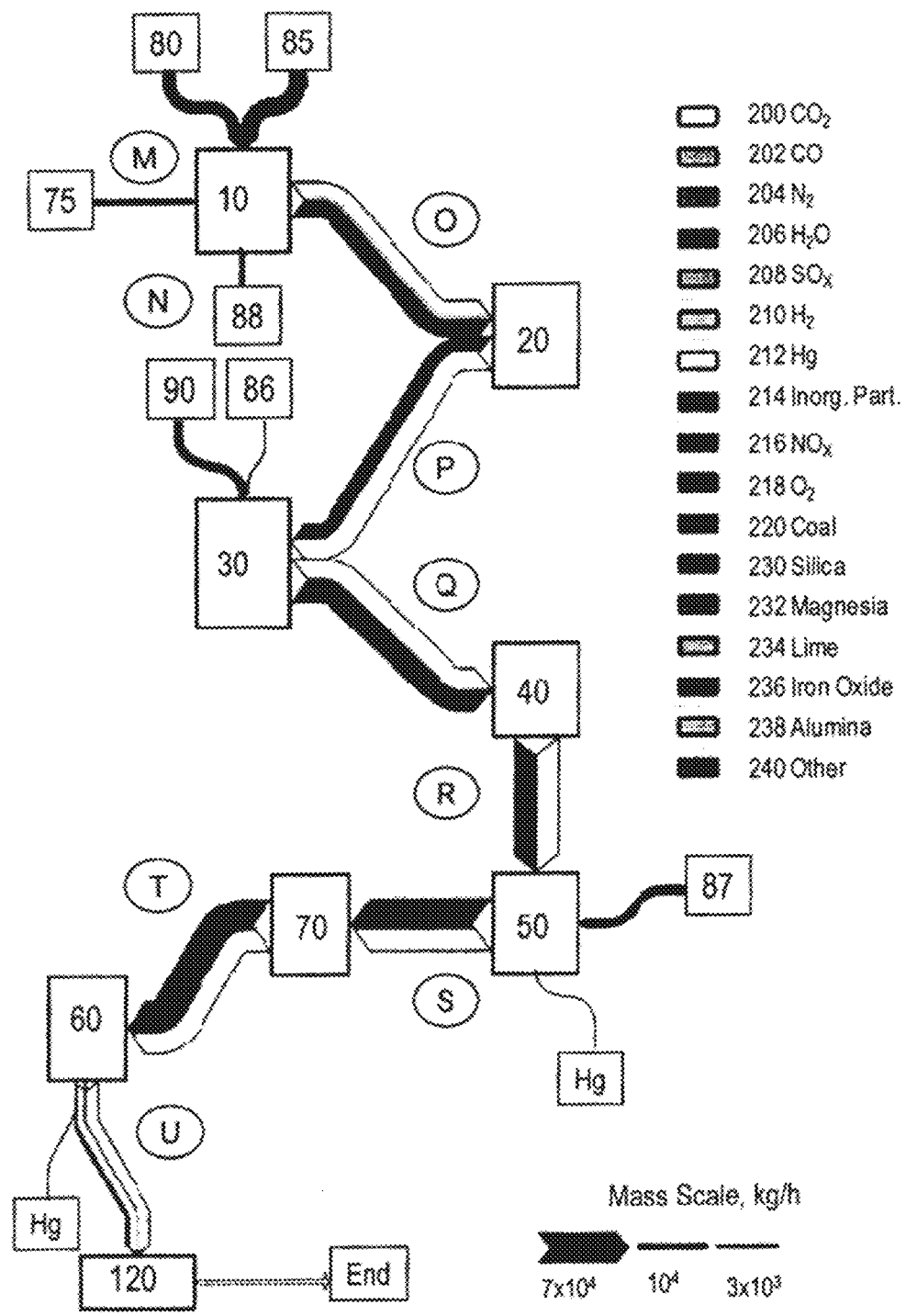
FIG. 6 shows a Sankey diagram for another exemplary two-HRSG embodiment of a system according to the present disclosure.
Figure 7:
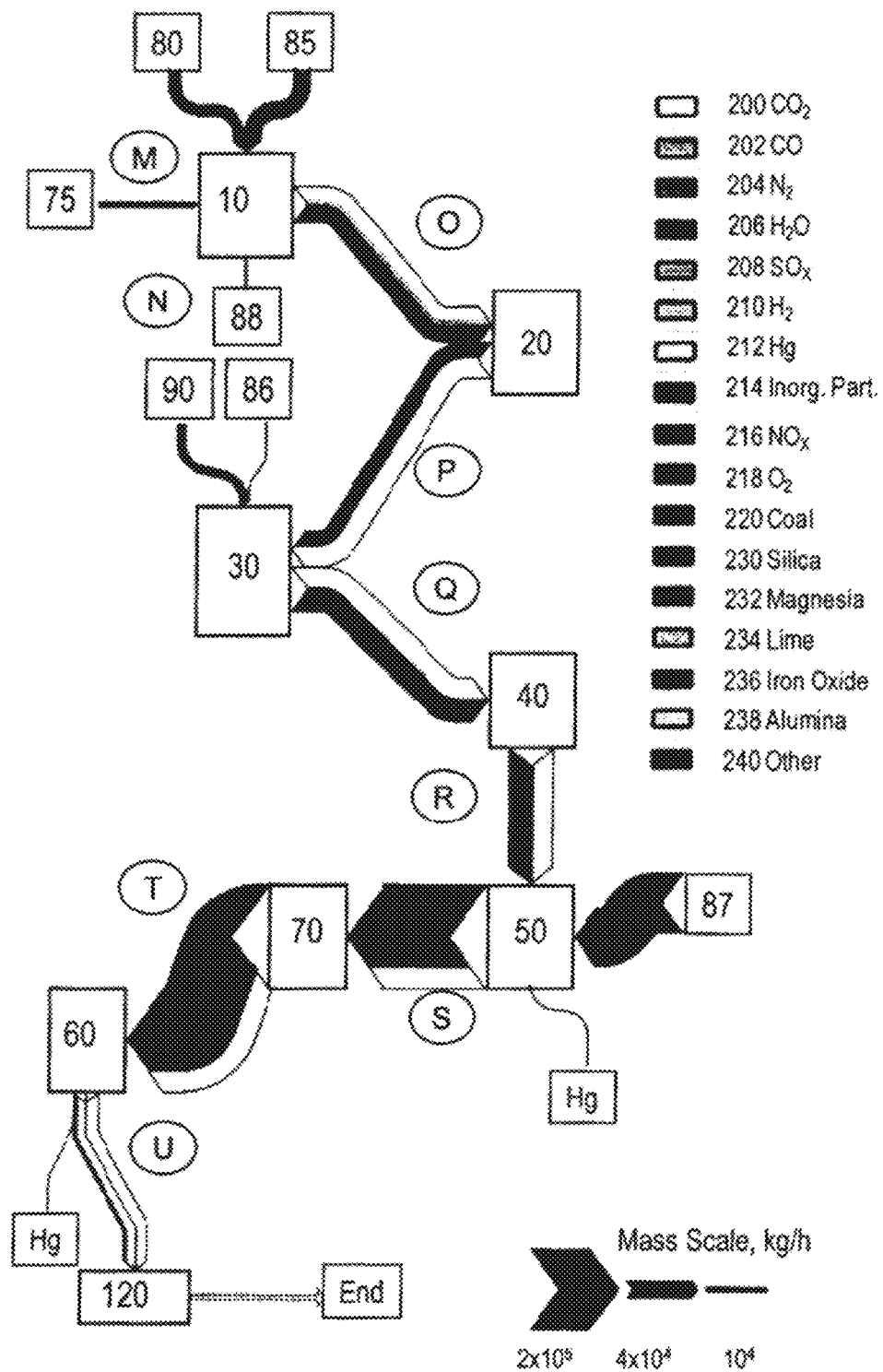
FIG. 7 shows a Sankey diagram for another exemplary two-HRSG embodiment of a system according to the present disclosure.
Figure 8:
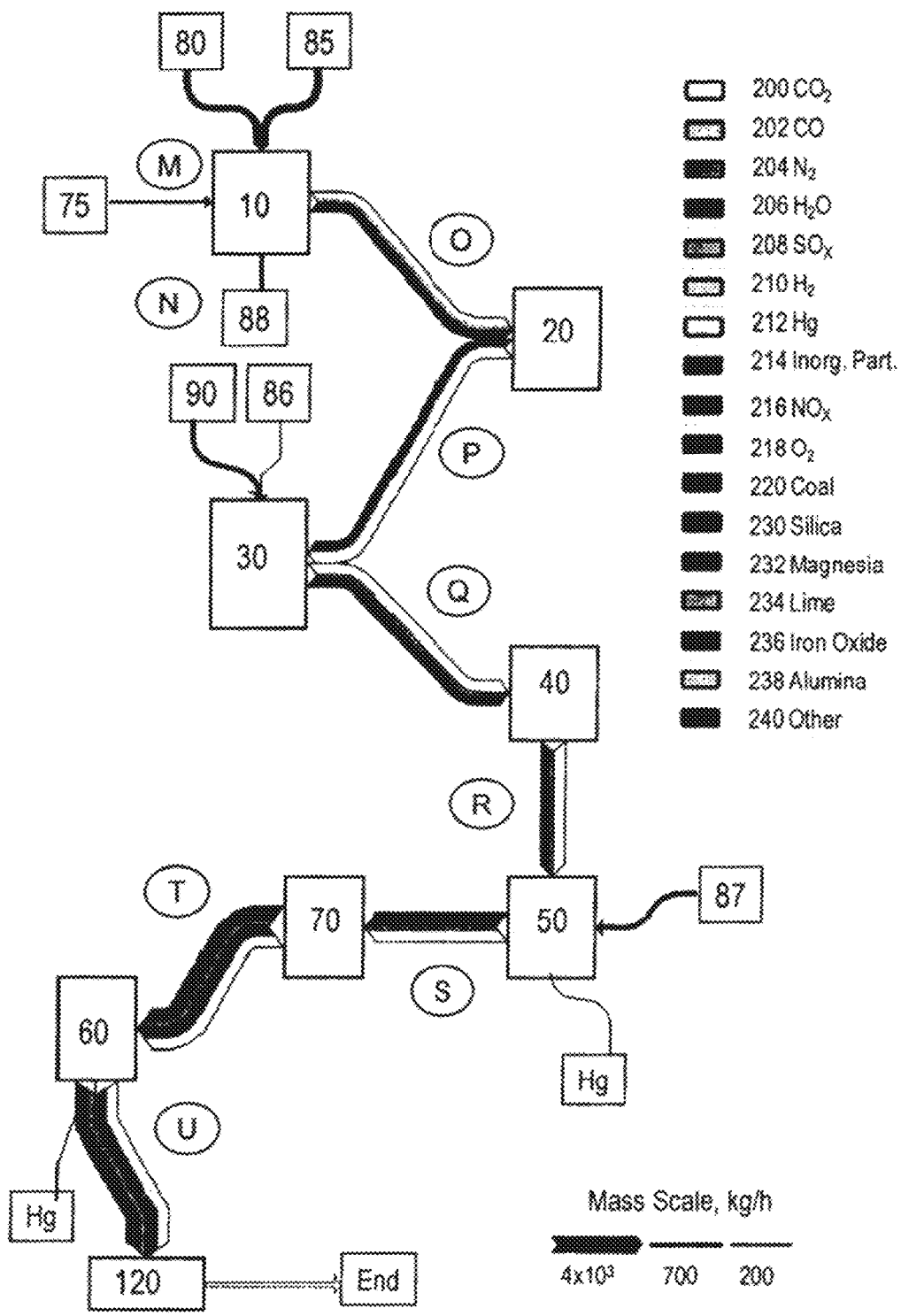
FIG. 8 shows a Sankey diagram for another exemplary two-HRSG embodiment of a system according to the present disclosure.

As shown in FIGS. 2-4, in certain embodiments, the system and method further comprise components for decontaminating the product gas and for generating electric power. Power generating section B comprises a steam turbine 100 operatively connected to a generator 110 for generating electricity. First and second HRSGs 20, 40 are fluidly connected to power generating section B via the steam turbine 100, separately from the fluid connection to the coal treatment system A. The first and second HRSGs transfer heat from the gas streams O and Q of section A to the water supplies 27, and 47 of section B, producing steam for steam sources 29, 49 that are fluidly connected to the steam generator 100. Suitable equipment and systems for implementing the disclosed methods are available from several manufacturers.

Figure 9:
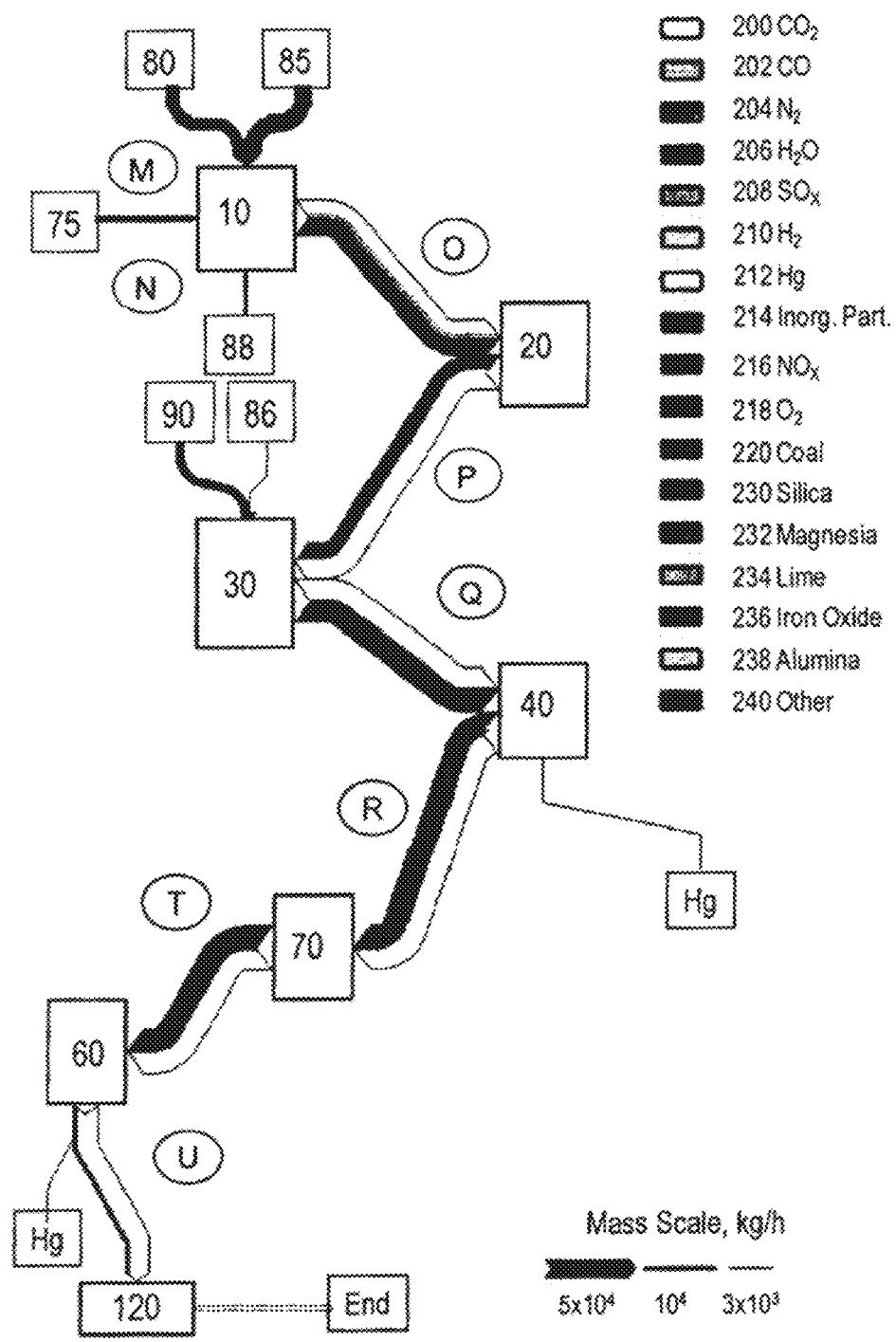
FIG. 9 shows a Sankey diagram for another exemplary two-HRSG embodiment of a system according to the present disclosure.

In the quench chamber 50, if needed, the temperature of the treated gas stream R is further reduced to a temperature sufficiently low to prevent the re-formation of contaminants, and to a suitable range to prevent damage to the wet scrubber 60 and/or baghouse 70. In the quench chamber 50, water spray is added to the gas stream to rapidly bring the temperature down to roughly 280° F., or just above the saturation temperature. FIG. 9 and Example 5 illustrate an embodiment without a quench chamber.

After reduction of the temperature to a suitable range, treated gas S is discharged from quench chamber 50, into the inlet 62 of wet scrubber 60. In wet scrubber 60, trace VOCs, $SO_x$ and remaining particulate matter are removed from treated gas S.

After treatment in wet scrubber 60, the treated gas U is discharged into baghouse 70, in which the sulfur from the $SO_x$ is collected. Thereafter, a "clean" gas stream T comprising cooled down $H_2O$ and $CO_2$ is discharged from the baghouse 70. The water can then be separated from the $CO_2$ stream, and the remaining $CO_2$ can then be captured and isolated for EPA approved sequestration or other approved carbon capture and sequestration (CCS) techniques by $CO_2$ removal system 120.

In an alternative embodiment, illustrated in FIG. 4, treated gas S discharged from the quench chamber is directed first to the baghouse 70 and thereafter to the wet scrubber 60.

Figure 2B:
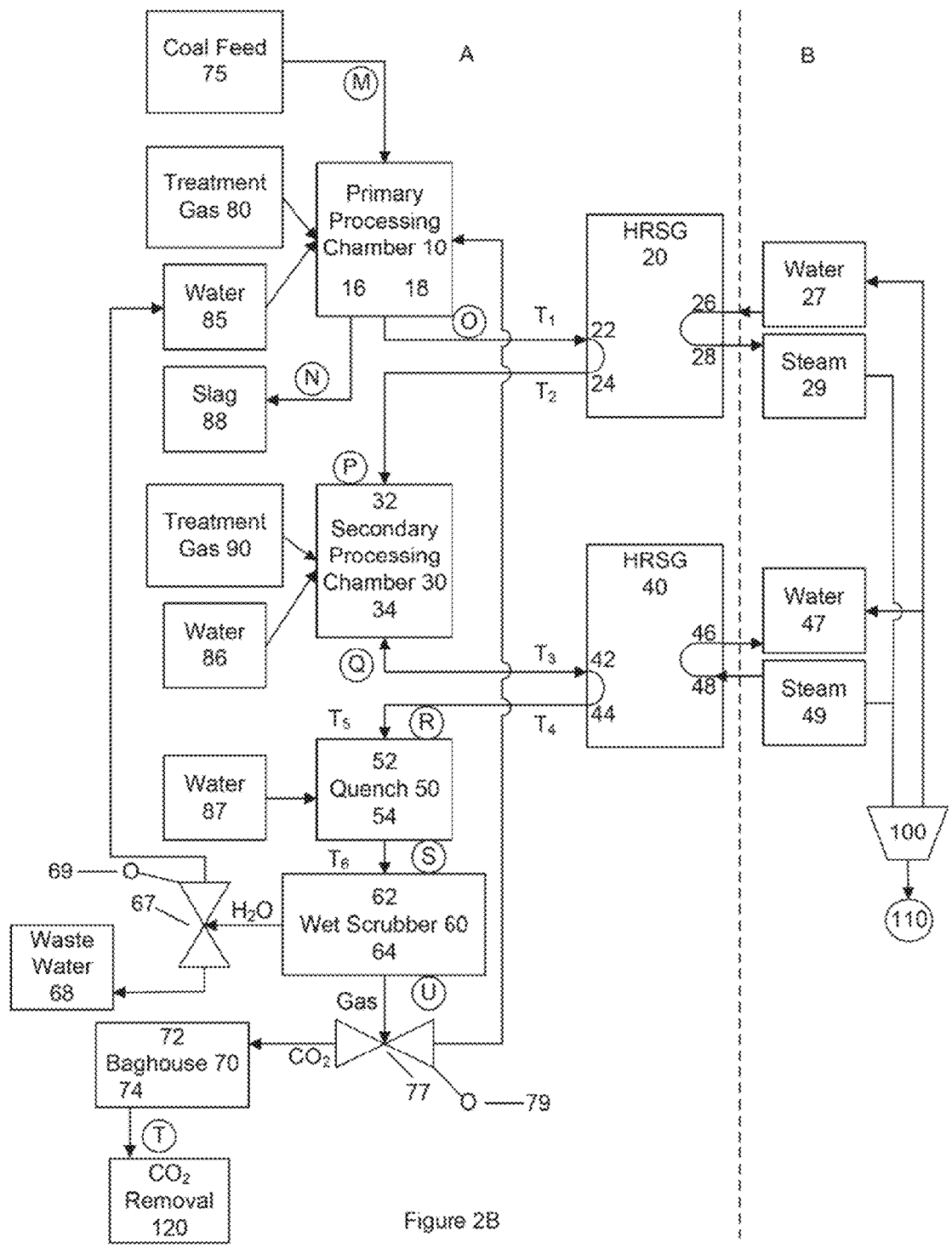

FIG. 2B illustrates an embodiment in which both water and $CO_2$ can be returned via separate pathways to the primary processing chamber 10. In this embodiment, the temperature of the wet scrubber 60 is maintained sufficiently low that the water vapor in gas stream U condenses into liquid. Programmable two-way distribution valve 67 may redirect the liquid water to either the primary processing chamber 10 or its water sources 85, or to a waste water treatment and/or discharge facility 68. The water redirected to the primary processing chamber can be used to supplement the water 85 added to the gas flow in the chamber, thereby reducing the amount of externally supplied water needed to cool gas flow O leaving the primary chamber. As the returned water has been distilled through condensation by the wet scrubber, it contains fewer potentially corrosive impurities than from source 85. This has the potential benefit of reducing chemical wear on the upstream components of the steam generating system.

Figure 2C:
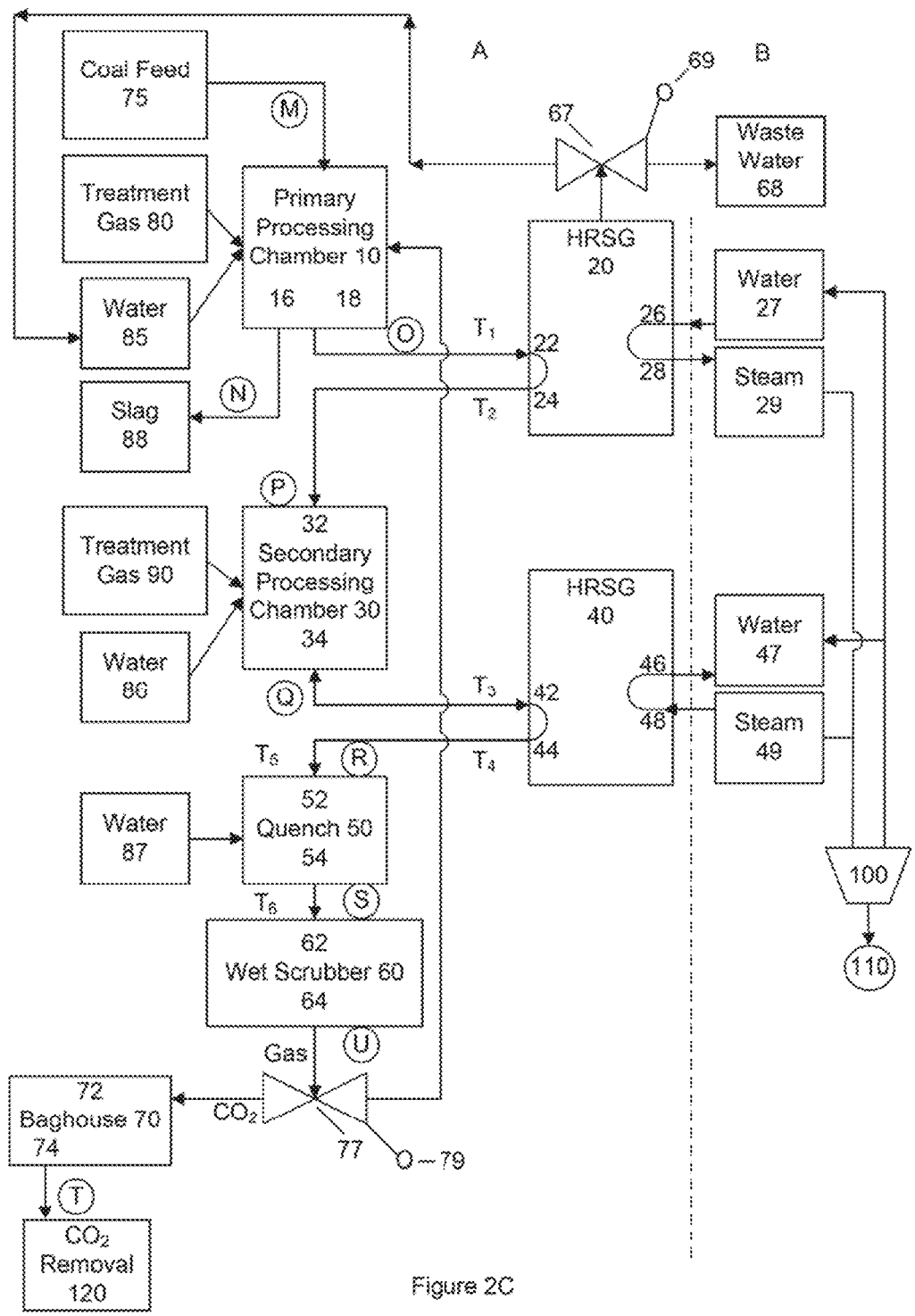

FIG. 2C illustrates yet another embodiment, in which water from gas flow O, exiting the primary processing chamber, may condense into a liquid in HRSG 20. This condensation step may result from sufficient heat transfer from O to the water at inlet 26 of the heat exchanger to cool the effluent gas from the primary chamber to the condensation point. In this embodiment, two-way valve 67 may be associated with the water flow from HRSG 20. Similar to the steps illustrated in FIG. 2B, the liquid water may then be returned to the primary processing chamber or its water supply, or to a separate waste water holding section 68. It is understood that a similar condensation step may occur in HRSG 40, and the liquid water returned to the processing chamber 10 or to a waste water holding section 68 by means of the controllable two-way valve 67.

Illustrated in both FIG. 2B and FIG. 2C is programmable two-way distribution valve 77 that may selectively direct $CO_2$ to the baghouse 70 for subsequent $CO_2$ removal at 120, or to the processing chambers, such as the primary processing chamber 10. The $CO_2$ returned to the primary processing chamber may improve the efficiency of the combustion process, both by increasing the pressure of the chamber and by decreasing the $CO/(CO+CO_2)$ ratio, thereby reducing soot formation.

FIGS. 2B and 2C further illustrate that both two-way valves 67 and 77 are under process control by an automated control system (not shown) through control mechanisms 69 and 79, respectively. In its most basic design, such an automatic control system comprises (a) one or a series of monitors that measure process parameters including but not limited to temperature, pressure, and input and output material composition, each of the monitors supply data related to its measured parameter, (b) a processor that receives the data from the monitors, and compares the data values from the parameter monitors to some series of optimal values, (c) a tangible memory containing computer-readable instructions for the processor to follow, and (d) an actuation mechanism to control system components that may alter the measured process parameters. For example, the processor may receive pressure data from a primary chamber monitor and, in response to receiving data indicating that the pressure in the chamber is below a threshold value, the processor may issue a command to the appropriate valve actuator to cause the valve to direct water and/or carbon dioxide to that chamber.

Temperature and pressure monitors may be located in the primary and secondary processing chambers. The volume of the water added from sources 85 and 86 to the primary and secondary processing chambers, respectively, may also be monitored. The composition of the gasses flowing from the various system components—including the effluent O from the primary chamber, Q from the secondary processing chamber, S from the quench chamber, U from the wet scrubber and T from the baghouse—may also be monitored. Such monitoring may be useful to regulate the amount of treatment gas 80 or 90 introduced into the primary and secondary chambers, respectively. In addition, the pressure generated by the combustion processes in both processing chambers 10 and 30 may be monitored. The reaction mixture composition and pressure in the two processing chambers can provide values to the control system processor to regulate the amount of $CO_2$ returned to the primary chamber via control mechanism 79 operatively controlled by an actuation mechanism of the control system. The amount of returned $CO_2$ may be used to optimize the combustion pressure or the $CO/(CO+CO_2)$ ratio. In addition, the temperatures monitored in the processing chambers can be used to regulate the amount of water injected into them from either the water sources 85 or 86, or from the water returned via two-way valve 67 via control mechanism 69 which is also operatively controlled by an actuation mechanism of the control system.

As noted above, the primary and secondary HRSGs are fluidly connected to a steam turbine 100. The heat extracted from the gas streams O, Q in each of the primary, secondary and any additional HRSGs, is combined and used to generate steam to drive the steam turbine 100. After condensation of the steam in the turbine 100, water is recycled back to each of the HRSGs to absorb the heat from the gas streams O, Q. In certain embodiments, steam 29, 49 produced by HRSG 20 and HRSG 40 drives a steam turbine 100 that drives a generator of electrical power 110 to generate electricity in a manner well known in the art.

The system may comprise a variety of equipment configurations, as shown in FIGS. 2-9, to accommodate different space and/or processing requirements. In addition, as shown in FIG. 4 or FIG. 9 compared to FIG. 2, the relative positions of the quench, wet scrubber and baghouse may be changed, as needed or desired.

FIGS. 5-9 show Sankey Diagrams of the system illustrated in FIG. 4, based on varying equipment and process conditions. As noted above, the present method comprises two fluid flows, a first flow carrying the products of combustion occurring in the PPC and SPC, and the second flow of the circulation of water cyclically through a HRSG and steam turbine. Examples 1-5 are discussed below. Illustrative calculations were made using a proprietary energy balance spreadsheet (Retech Systems LLC, Ukiah, Calif.) that calculates the energy available during the combustion process for given input materials and an oxidant, such as air, oxygen or mixtures thereof. A balanced system must have the input and output mass and the input and output energy equal.

The input coal composition used in these Examples is that of the coal from the Union Pacific Corporation's Dugout Canyon Mine, Price, Utah. The analysis is provided in Table 1, below, and is indicated by M in FIGS. 1-9.

TABLE 1

Chemical Composition of Input Coal (M)
Dugout Canyon Mine, Price Utah
(http://www.uprr.com/customers/energy/coal/utah/soldier.shtml)

|  | Total % | Ash % | lbs/hr | kg/hr |
|---|---|---|---|---|
| Carbon | 72.20 |  | 30083 | 13646 |
| Hydrogen | 5.00 |  | 2083 | 945 |
| Oxygen | 10.30 |  | 4292 | 1947 |
| Nitrogen | 1.40 |  | 583 | 465 |
| Sulfur | 0.48 |  | 200 | 91 |
| ASH: | 10.62 |  |  |  |
| Silica | 6.55 | 61.7 | 2730 | 1238 |
| Alumina | 1.75 | 16.5 | 730 | 331 |
| Titania | 0.06 | 0.6 | 27 | 12 |
| Ferric oxide | 0.32 | 3.0 | 133 | 60 |
| Lime | 0.82 | 7.7 | 341 | 155 |
| Magnesia | 0.18 | 1.7 | 75 | 34 |
| Potassium oxide | 0.10 | 0.9 | 40 | 18 |
| Sodium oxide | 0.08 | 0.8 | 35 | 16 |
| Sulfur trioxide | 0.53 | 5.0 | 221 | 100 |
| Phosphorus pentoxide | 0.07 | 0.7 | 31 | 14 |
| Undetermined | 0.15 | 1.4 | 62 | 28 |
| TOTAL | 100.00 |  | 41,667 | 18,900 |

The analysis provided in Table 1 does not indicate the presence of mercury. However, according to the US Energy Information Administration's website, www.eia.doe.gov/oiaf/analysispaper/stb/, mercury levels in coal can vary by region, from 2.04 up to 63.90 lbs/trillion Btu. At 12,000 Btu per pound, this equates to 24.5 to 766 lbs of mercury per billion pounds of coal. For the purposes of this study, the high end of the range has been assumed. It has further been assumed that all of this mercury will turn to vapor and travel with the gas through the system and be condensed in two places in the offgas system: the quench chamber 50, and the wet scrubber 60. The liquid mercury can then be captured and removed by tapping the bottom of these two vessels. Ninety percent is assumed to be captured in the quench chamber 50 and the remaining 10% in the scrubber 60. Any mercury remaining in the offgas will thus be below regulatory requirements.

Example 1

Baseline Case: Outlet Temperatures of PPC ($T_1$) and SPC ($T_3$) Both=2400° F. (1316° C.)

The outlet temperatures of PPC 10 ($T_1$) and SPC 20 ($T_2$) are controlled by adding water from water sources 85, 86 to the respective processing chambers. The mass flow rates in kilograms per hour (kg/h) of all inputs and outputs are shown in Table 2 for the slag chemical composition N, and Table 3, for the chemical composition of the gas flow at points O, P, Q, R, S, T, and U indicated in the schematic diagram of FIG. 5.

In this Example, the coal feed 75 is taken as 18,900 kg/h of coal having the composition M given in Table 1, above. The treatment gas 80 input to the primary processing chamber 10 is 28,900 kg/h $O_2$, and the water 85 input to the primary processing chamber 10 is 41,800 kg/h $H_2O$.

Given these inputs for a primary processing chamber 10 of volume 5,000 ft$^3$ (141,584 l) and a secondary processing chamber 30 of volume 10,100 ft$^3$ (286,000 l), the slag 88 has the composition N, summarized in Table 2, below.

TABLE 2

| Slag Chemical Composition (N), kg/h | |
| --- | --- |
| Silica | 1,110 |
| Magnesia | 30.7 |
| Lime | 139 |
| Iron Oxide | 54.2 |
| Alumina | 298 |
| Other | 170 |

The treatment gas input 90 to the secondary processing chamber 30 is 21,334 kg/h $O_2$, and the water input 86 to the secondary processing chamber 30 is 820 kg/h $H_2O$. The water input 87 to the quench chamber 50 is 21,467 kg/h $H_2O$. The quench chamber 50 inlet temperature, $T_5$, is 658° F. (328° C.), and the quench chamber 50 outlet temperature, $T_6$, is 260° F. (127° C.). The mercury recovery at the quench chamber 50 is 1.3 1×10$^{-2}$ kg/h, and 1.45×10$^{-2}$ kg/h at the wet scrubber 60.

The calculated analysis of the chemical composition of the gas flow is presented in Table 3, below, for the following points of the process:

primary processing chamber 10 outlet gas, O;
first HRSG 20 outlet gas, P;
secondary processing chamber 30 outlet gas, Q;
second HRSG 40 outlet gas, R;
quench chamber 50 outlet gas, S;
wet scrubber 60 outlet gas, U;
baghouse 70 outlet gas, T.

The basic condition of this Example is that the outlet temperatures of the primary processing chamber 10 ($T_1$) and the secondary processing chamber 30 ($T_3$) are both equal to 2400° F. (1316° C.). The resulting outlet temperatures of the first HRSG 20 ($T_2$) and the second HRSG 40 ($T_4$) are both 658° F. (328° C.).

Example 2

Outlet Temperature of PPC (T1)= 2800° F. (1538° C.)

This study assumes that components downstream of the primary processing chamber 10 can tolerate an outlet temperature of the PPC, $T_1$, of 2800° F. (1538° C.); less water is thus required to control the temperature. This Example also differs from Example 1 in that no water is added in the SPC 20; the outlet temperature of the SPC, $T_3$, only reaches 2568° F. (1409° C.). The mass flow rates in kilograms per hour (kg/h) of all inputs and outputs are shown in Table 2, above, for the slag chemical composition N, and Table 4, below, for the chemical composition of the gas flow at points O, P, Q, R, S, T, and U indicated in the schematic diagram of FIG. 6.

In this Example, the coal feed 75 is taken as 18,900 kg/h of coal having the composition M given in Table 1, above. The treatment gas 80 input to the primary processing chamber 10 is 28,900 kg/h $O_2$, and the water 85 input to the primary processing chamber 10 is reduced to 34,800 kg/h $H_2O$. The primary processing chamber 10 has a volume 5,000 ft$^3$ (141,584 l) and the secondary processing chamber 30 has a volume 10,100 ft$^3$ (286,000 l). The slag 88 has the composition N, summarized in Table 2, above.

The treatment gas input 90 to the secondary processing chamber 30 is 20,800 kg/h $O_2$, and the water input 86 to the secondary processing chamber 30 is 0 kg/h $H_2O$. The water input 87 to the quench chamber 50 is 19,500 kg/h $H_2O$. The quench chamber 50 inlet temperature, $T_5$, is 658° F. (328° C.), and the quench chamber 50 outlet temperature, $T_6$, is 260° F. (127° C.). The mercury recovery at the quench chamber 50 is 1.31×10$^{-2}$ kg/h, and 1.45×10$^{-2}$ kg/h at the wet scrubber 60.

The calculated analysis of the chemical composition of the gas flow is presented in Table 4, below, for the points of the process O, P, Q, R, S, U, and T, as in Example 1.

TABLE 3

| Gas Chemical Composition, kg/h | | | | | | | |
| --- | --- | --- | --- | --- | --- | --- | --- |
| | O | P | Q | R | S | T | U |
| $CO_2$ | 3.22 × 10$^4$ | 4.90 × 10$^4$ | 5.00 × 10$^4$ | 5.00 × 10$^4$ | 5.00 × 10$^4$ | 5.00 × 10$^4$ | 5.00 × 10$^4$ |
| CO | 1.13 × 10$^4$ | 6.00 × 10$^2$ | 0 | 0 | 0 | 0 | 0 |
| $O_2$ | 0 | 0 | 8.24 × 10$^3$ | 8.20 × 10$^3$ | 8.20 × 10$^3$ | 8.20 × 10$^3$ | 8.20 × 10$^3$ |
| $N_2$ | 1.24 × 10$^3$ | 1.24 × 10$^3$ | 1.24 × 10$^3$ | 1.24 × 10$^3$ | 1.24 × 10$^3$ | 1.24 × 10$^3$ | 1.24 × 10$^3$ |
| $H_2O$ | 4.20 × 10$^4$ | 3.51 × 10$^4$ | 5.03 × 10$^4$ | 5.03 × 10$^4$ | 7.18 × 10$^4$ | 7.18 × 10$^4$ | 1.67 × 10$^3$ |
| SO$x$ | 1.79 × 10$^2$ | 1.81 × 10$^2$ | 1.82 × 10$^2$ | 2.26 × 10$^2$ | 2.27 × 10$^2$ | 2.27 × 10$^2$ | 2.27 × 10$^1$ |
| $H_2$ | 8.36 × 10$^2$ | 1.61 × 10$^3$ | 0 | 0 | 0 | 0 | 0 |
| Hg | 1.45 × 10$^{-2}$ | 1.45 × 10$^{-2}$ | 1.45 × 10$^{-2}$ | 1.45 × 10$^{-2}$ | 1.45 × 10$^{-2}$ | 1.45 × 10$^{-2}$ | 0 |
| Inorg. Part. | 2.01 × 10$^2$ | 2.01 × 10$^2$ | 2.01 × 10$^2$ | 2.01 × 10$^2$ | 2.01 × 10$^2$ | 2.01 × 10$^2$ | 1.005 |
| NO$_x$ | 1.94 × 10$^{-3}$ | 0 | 15.60 | 1.55 × 10$^{-3}$ | 3.00 × 10$^{-5}$ | 3.00 × 10$^{-5}$ | 3.00 × 10$^{-5}$ |

TABLE 4

Gas Chemical Composition, kg/h

|  | O | P | Q | R | S | T | U |
|---|---|---|---|---|---|---|---|
| $CO_2$ | $2.95 \times 10^4$ | $4.90 \times 10^4$ | $5.00 \times 10^4$ | $5.00 \times 10^4$ | $5.00 \times 10^4$ | $5.00 \times 10^4$ | $5.00 \times 10^4$ |
| CO | $1.30 \times 10^4$ | $7.19 \times 10^2$ | 0 | 0 | 0 | 0 | 0 |
| $O_2$ | 0 | 0 | $7.68 \times 10^3$ | $7.64 \times 10^3$ | $7.64 \times 10^3$ | $7.64 \times 10^3$ | $7.64 \times 10^3$ |
| $N_2$ | $1.24 \times 10^3$ | $1.24 \times 10^3$ | $1.24 \times 10^3$ | $1.28 \times 10^3$ | $1.28 \times 10^3$ | $1.28 \times 10^3$ | $1.28 \times 10^3$ |
| $H_2O$ | $3.70 \times 10^4$ | $2.91 \times 10^4$ | $5.03 \times 10^4$ | $4.33 \times 10^4$ | $6.29 \times 10^4$ | $6.29 \times 10^4$ | $1.67 \times 10^3$ |
| $SO_x$ | $1.79 \times 10^2$ | $1.81 \times 10^2$ | $1.82 \times 10^2$ | $2.26 \times 10^2$ | $2.27 \times 10^2$ | $2.27 \times 10^2$ | $2.27 \times 10^1$ |
| $H_2$ | $7.10 \times 10^2$ | $1.60 \times 10^3$ | 0 | 0 | 0 | 0 | 0 |
| Hg | $1.45 \times 10^{-2}$ | $1.45 \times 10^{-2}$ | $1.45 \times 10^{-2}$ | $1.45 \times 10^{-2}$ | $1.45 \times 10^{-3}$ | $1.45 \times 10^{-3}$ | 0 |
| Inorg. Part. | $2.01 \times 10^2$ | $2.01 \times 10^2$ | $2.01 \times 10^2$ | $2.01 \times 10^2$ | $2.01 \times 10^2$ | $2.01 \times 10^2$ | 1.005 |
| $NO_x$ | $4.6 \times 10^{-2}$ | 0 | 22.4 | $1.53 \times 10^{-3}$ | $3.00 \times 10^{-5}$ | $3.00 \times 10^{-5}$ | $3.00 \times 10^{-5}$ |

The basic condition of this Example is that the outlet temperatures of the primary processing chamber 10 ($T_1$) 2800° F. (1538° C.). The resulting outlet temperatures of the first HRSG 20 ($T_2$) and the second HRSG 40 ($T_4$) are both 658° F. (328° C.).

Example 3

Rapid Quench

This study examines the expected performance if a rapid quench of the gases is required to prevent the formation of dioxins or furans, a step that would be likely to be required if chlorine is present in the coal feed. The mass flow rates in kilograms per hour (kg/h) of all inputs and outputs are shown in Table 2, above, for the slag chemical composition N, and Table 5, below, for the chemical composition of the gas flow at points O, P, Q, R, S, T, and U indicated in the schematic diagram of FIG. 7.

In this Example, the coal feed 75 is taken as 18,900 kg/h of coal having the composition M given in Table 1, above. The treatment gas 80 input to the primary processing chamber 10 is 28,900 kg/h $O_2$, and the water 85 input to the primary processing chamber 10 is 41,800 kg/h $H_2O$. The primary processing chamber 10 has a volume 5,000 ft³ (141,584 l) and the secondary processing chamber 30 has a volume 10,100 ft³ (286,000 l). The slag 88 has the composition N, summarized in Table 2, above.

The treatment gas input 90 to the secondary processing chamber 30 is 20,800 kg/h $O_2$, and the water input 86 to the secondary processing chamber 30 is 0 kg/h $H_2O$. The water input 87 to the quench chamber 50 is 19,500 kg/h $H_2O$. The quench chamber 50 inlet temperature, $T_5$, is 658° F. (328° C.), and the quench chamber 50 outlet temperature, $T_6$, is 260° F. (127° C.). The mercury recovery at the quench tower 50 is $1.31 \times 10^{-2}$ kg/h, and $1.45 \times 10^{-2}$ kg/h at the wet scrubber 60.

The calculated analysis of the chemical composition of the gas flow is presented in Table 5, below, for the points of the process O, P, Q, R, S, U, and T, as in Example 1.

TABLE 5

Gas Chemical Composition, kg/h

|  | O | P | Q | R | S | T | U |
|---|---|---|---|---|---|---|---|
| $CO_2$ | $2.95 \times 10^4$ | $4.90 \times 10^4$ | $5.00 \times 10^4$ | $5.00 \times 10^4$ | $5.00 \times 104$ | $5.00 \times 10^4$ | $5.00 \times 10^4$ |
| CO | $1.30 \times 10^4$ | $7.19 \times 10^2$ | 0 | 0 | 0 | 0 | 0 |
| $O_2$ | 0 | 0 | $7.68 \times 10^3$ | $7.64 \times 10^3$ | $7.64 \times 103$ | $7.64 \times 10^3$ | $7.64 \times 10^3$ |
| $N_2$ | $1.24 \times 10^3$ | $1.24 \times 10^3$ | $1.24 \times 10^3$ | $1.28 \times 10^3$ | $1.28 \times 103$ | $1.28 \times 10^3$ | $1.28 \times 10^3$ |
| $H_2O$ | $3.70 \times 10^4$ | $2.91 \times 10^4$ | $5.03 \times 10^4$ | $4.33 \times 10^4$ | $6.29 \times 104$ | $6.29 \times 10^4$ | $1.67 \times 10^3$ |
| $SO_x$ | $1.79 \times 10^2$ | $1.81 \times 10^2$ | $1.82 \times 10^2$ | $2.26 \times 10^2$ | $2.27 \times 102$ | $2.27 \times 10^2$ | $2.27 \times 10^1$ |
| $H_2$ | $7.10 \times 10^2$ | $1.60 \times 10^3$ | 0 | 0 | 0 | 0 | 0 |
| Hg | $1.45 \times 10^{-2}$ | $1.45 \times 10^{-2}$ | $1.45 \times 10^{-2}$ | $1.45 \times 10^{-2}$ | $1.45 \times 10-3$ | $1.45 \times 10^{-3}$ | 0 |
| Inorg. Part. | $2.01 \times 10^2$ | $2.01 \times 10^2$ | $2.01 \times 10^2$ | $2.01 \times 10^2$ | $2.01 \times 102$ | $2.01 \times 10^2$ | 1.005 |
| $NO_x$ | $4.6 \times 10^{-2}$ | 0 | 22.4 | $1.53 \times 10^{-3}$ | $3.00 \times 10-5$ | $3.00 \times 10^{-5}$ | $3.00 \times 10^{-5}$ |

The basic condition of this Example is that the outlet temperatures of the primary processing chamber 10 ($T_1$) 2800° F. (1538° C.). The resulting outlet temperatures of the first HRSG 20 ($T_2$) and the second HRSG 40 ($T_4$) are both 658° F. (328° C.).

Example 4

Smaller (PACT-8) Size System

This study examines the expected performance a smaller size system, roughly the size of the PACT-8 (Retech Systems LLC, Ukiah, Calif.), that can accommodate a coal feed of about 1,000 kg/hr. The mass flow rates in kilograms per hour (kg/h) of all inputs and outputs are shown in Table 6, below, for the slag chemical composition N, and Table 7, below, for the chemical composition of the gas flow at points O, P, Q, R, S, T, and U indicated in the schematic diagram of FIG. 8.

In this Example, the coal feed 75 is taken as 1,000 kg/h of coal having the composition M given in Table 1, above. The treatment gas input 80 to the primary processing chamber 10 is 1,470 kg/h $O_2$, and the water 85 input to the primary processing chamber 10 is 1,900 kg/h $H_2O$. The primary processing chamber 10 has a volume 265 ft³ (7503 l) and the secondary processing chamber 30 has a volume 500 ft³ (14158 l). The slag 88 has the composition N, summarized in Table 6.

TABLE 6

| Slag Chemical Composition (N), kg/h | |
|---|---|
| Silica | 59 |
| Magnesia | 1.63 |

TABLE 6-continued

| Slag Chemical Composition (N), kg/h | |
|---|---|
| Lime | 7.36 |
| Iron Oxide | 2.87 |
| Alumina | 15.8 |
| Other | 8.98 |

The treatment gas input 90 to the secondary processing chamber 30 is 1,170 kg/h $O_2$, and the water input 86 to the secondary processing chamber 30 is 0 kg/h $H_2O$. The water input 87 to the quench chamber 50 is 1,108 kg/h $H_2O$. The quench chamber 50 inlet temperature, $T_5$, is 658° F. (328° C.), and the quench chamber 50 outlet temperature, $T_6$, is 260° F. (127° C.). The mercury recovery at the quench chamber 50 is $6.9 \times 10^{-3}$ kg/h, and $7.7 \times 10^{-4}$ kg/h at the wet scrubber 60.

The calculated analysis of the chemical composition of the gas flow is presented in Table 7, below, for the points of the process O, P, Q, R, S, U, and T, as in Example 1.

TABLE 7

| | Gas Chemical Composition, kg/h | | | | | | |
|---|---|---|---|---|---|---|---|
| | O | P | Q | R | S | T | U |
| $CO_2$ | $1.66 \times 10^3$ | $2.59 \times 10^3$ | $2.64 \times 10^3$ | $2.54 \times 10^3$ | $2.54 \times 10^3$ | $2.54 \times 10^3$ | $2.54 \times 10^3$ |
| CO | $6.25 \times 10^2$ | $3.66 \times 10^1$ | 0 | 0 | 0 | 0 | 0 |
| $O_2$ | 0 | 0 | $4.74 \times 10^2$ | $4.73 \times 10^2$ | $4.73 \times 10^2$ | $3.46 \times 10^3$ | $3.46 \times 10^3$ |
| $N_2$ | $7.97 \times 10^2$ | $7.97 \times 10^2$ | $7.97 \times 10^2$ | $7.97 \times 10^2$ | $7.97 \times 10^2$ | $7.97 \times 10^2$ | $7.97 \times 10^2$ |
| $H_2O$ | $1.98 \times 10^3$ | $1.6 \times 10^3$ | $2.35 \times 10^3$ | $2.36 \times 10^3$ | $3.46 \times 10^3$ | $3.46 \times 10^3$ | $3.46 \times 10^3$ |
| $SO_x$ | $9.49 \times 10^0$ | $9.59 \times 10^0$ | $9.62 \times 10^0$ | $1.2 \times 10^0$ | $1.2 \times 10^0$ | $1.2 \times 10^0$ | $1.2 \times 10^0$ |
| $H_2$ | $4.22 \times 10^1$ | $8.4 \times 10^2$ | 0 | 0 | 0 | 0 | 0 |
| Hg | $7.67 \times 10^{-3}$ | $7.67 \times 10^{-3}$ | $7.67 \times 10^{-3}$ | $7.67 \times 10^{-3}$ | $7.7 \times 10^{-4}$ | $7.7 \times 10^{-4}$ | $7.7 \times 10^{-4}$ |
| Inorg. Part. | $1.06 \times 10^1$ | $1.06 \times 10^1$ | $1.06 \times 10^1$ | $1.06 \times 10^1$ | $1.06 \times 10^1$ | $1.06 \times 10^1$ | $1.06 \times 10^1$ |
| $NO_x$ | $3 \times 10^{-4}$ | 0 | $1.03 \times 10^0$ | $3 \times 10^{-4}$ | $3 \times 10^{-4}$ | $3 \times 10^{-4}$ | $3 \times 10^{-4}$ |

The smaller sizes of the PPC 10 and the SPC 30 in this Example were associated with lower values of $T_1$, 2400° F. (1316° C.), and $T_3$, 2012° F. (1100° C.). The resulting outlet temperatures of the first HRSG 20 ($T_2$) and the second HRSG 40 ($T_4$) are both 658° F. (328° C.).

Example 5

Outlet Temperature of HRSG1 ($T_2$)=HRSG2 ($T_4$)=260° F. (127° C.)

This study assumes that outlet temperatures from both HRSGs are 260° F. (127° C.), $T_3$, only reaches 2568° F. (1409° C.). The mass flow rates in kilograms per hour (kg/h) of all inputs and outputs are shown in Table 2, above, for the slag chemical composition N, and Table 4, below, for the chemical composition of the gas flow at points O, P, Q, R, S, T, and U indicated in the schematic diagram of FIG. 9.

As in Example 1, the coal feed 75 is taken as 18,900 kg/h of coal having the composition M given in Table 1, above. The treatment gas input 80 to the primary processing chamber 10 is 28,900 kg/h $O_2$, but the water 85 input to the primary processing chamber 10 is reduced to 41,000 kg/h $H_2O$. The primary processing chamber 10 has a volume 5,000 ft³ (141,584 l) and the secondary processing chamber 30 has a volume 10,100 ft³ (260,500 l). The slag 88 has the composition N, summarized in Table 2, above.

The treatment gas input 90 to the secondary processing chamber 30 is 21,300 kg/h $O_2$, and the water input 86 to the secondary processing chamber 30 is 0 kg/h $H_2O$. The quench chamber 50 is eliminated. Mercury recovery at the second HRSG is $1.31 \times 10^{-2}$ kg/h, and $1.45 \times 10^{-2}$ kg/h at the wet scrubber 60.

The calculated analysis of the chemical composition of the gas flow is presented in Table 8, below, for the points of the process O, P, Q, R, U, and T, as in Example 1.

TABLE 8

| | Gas Chemical Composition, kg/h | | | | | |
|---|---|---|---|---|---|---|
| | O | P | Q | R | T | U |
| $CO_2$ | $3.22 \times 10^4$ | $4.90 \times 10^4$ | $5.00 \times 10^4$ | $5.00 \times 10^4$ | $5.00 \times 10^4$ | $5.00 \times 10^4$ |
| CO | $1.13 \times 10^4$ | $6 \times 10^2$ | 0 | 0 | 0 | 0 |
| $O_2$ | 0 | 0 | $8.17 \times 10^3$ | $8.13 \times 10^3$ | $8.13 \times 10^3$ | $8.13 \times 10^3$ |
| $N_2$ | $1.24 \times 10^3$ | $1.24 \times 10^3$ | $1.23 \times 10^3$ | $1.24 \times 10^3$ | $1.24 \times 10^3$ | $1.24 \times 10^3$ |
| $H_2O$ | $4.20 \times 10^4$ | $3.48 \times 10^4$ | $4.95 \times 10^4$ | $4.95 \times 10^4$ | $4.95 \times 10^4$ | $1.67 \times 10^3$ |

TABLE 8-continued

| | Gas Chemical Composition, kg/h | | | | | |
|---|---|---|---|---|---|---|
| | O | P | Q | R | T | U |
| $SO_x$ | $1.79 \times 10^2$ | $1.81 \times 10^2$ | $1.82 \times 10^2$ | $2.27 \times 10^2$ | $2.27 \times 10^2$ | $2.27 \times 10^1$ |
| $H_2$ | $8.36 \times 10^2$ | $1.65 \times 10^3$ | 0 | 0 | 0 | 0 |
| Hg | $1.45 \times 10^{-2}$ | $1.45 \times 10^{-2}$ | $1.45 \times 10^{-2}$ | $1.45 \times 10^{-2}$ | $1.45 \times 10^{-3}$ | 0 |
| Inorg. Part. | $2.01 \times 10^2$ | $2.01 \times 10^2$ | $2.01 \times 10^2$ | $2.01 \times 10^2$ | $2.01 \times 10^0$ | 1.005 |
| $NO_x$ | $1.94 \times 10^{-3}$ | 0 | 9.06 | $4 \times 10^{-5}$ | $4 \times 10^{-5}$ | $4 \times 10^{-5}$ |

Baseline energy-balance calculations indicate that desirable temperatures for the gas entering the HRSGs may range from about 2,000° F. to about 2900° F. (about 1,100° C. to about 1,600° C.), and that desirable temperatures for the gas exiting the HRSGs may range from about 258° F. to about 1500° F. (about 120° C. to about 860° C.).

In an alternative embodiment, the gas output from the PPC 10 may be discharged directly into a turbine that is adapted to receive gases at the temperatures resulting after oxidation, e.g., about 10,000° F. (about 5,540° C.), without decreasing the temperature of the gas to a temperature that the HRSGs can accommodate.

Example 6

Treatment of Thermal Waste Gas

The present disclosure is directed to a method and system for generating energy from a gaseous waste stream, such as gaseous waste streams resulting from certain industrial processes including, but not limited to, power plants, industrial manufacturers, industrial facilities, waste to power plants, generators, steel mills, incinerators, factories, landfills, methane conversion plants, landfill flares, smokestacks, medical waste facilities, and the like. Such gaseous waste streams may comprise, for example, gases such as carbon monoxide (CO), carbon dioxide ($CO_2$), hydrogen ($H_2$), and combinations of the foregoing; and additionally toxic and/or environmentally hazardous compounds such as nitrogen oxides ("$NO_x$"), sulfur oxides ("$SO_x$"), dioxin, polychlorinated dibenzodioxins ("dioxins"), dioxin-like compounds ("DLCs"), polychlorinated dibenzofurans ("furans"), polychlorinated biphenyls ("PCBs"), acids (e.g., hydrochloric (HCl), nitric ($HNO_3$), sulfuric ($H_2SO_4$), and the like), and combinations of the foregoing.

Figure 10:
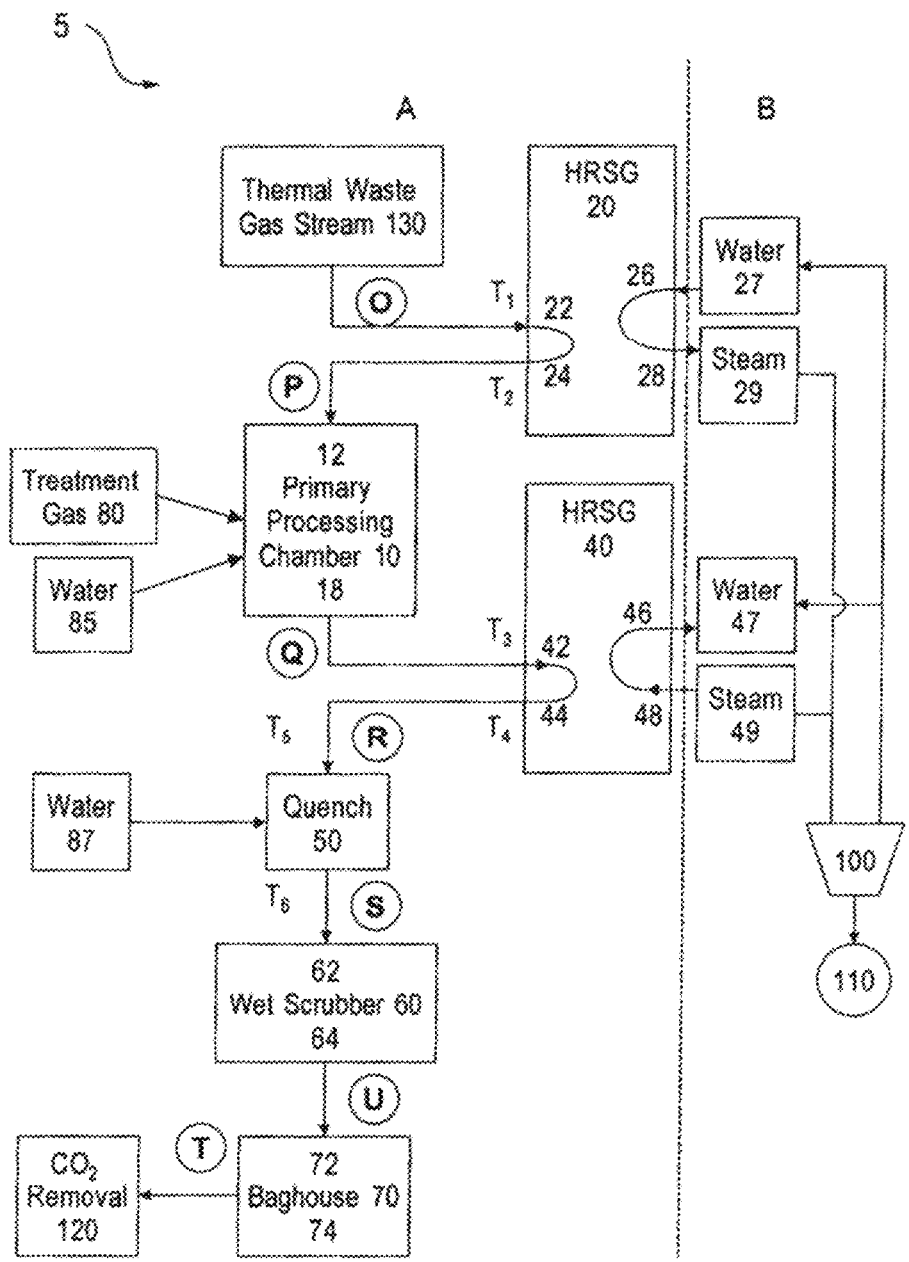
FIG. 10 is a flow-chart showing an alternative exemplary embodiment of the system that is useful for treating a thermal waste gas stream.

FIG. 10 is a flow-chart illustrating one exemplary system and method according to the present disclosure, which comprises a gaseous treatment section A operatively connected to a power generating section B. As shown, gaseous treatment section A comprises a first heat recovery steam generator 20 ("first HRSG"), a primary processing chamber 10, a second HRSG 40, a quench chamber 50, a wet scrubber 60, and a baghouse 70, all fluidly connected. A source of a treatment gas 80, such as $O_2$, is fluidly connected to the primary processing chamber 10. Suitable equipment and systems for implementing the disclosed methods are available from several manufacturers.

Power generating section B comprises a steam turbine 100 operatively connected to an electric generator 110, for generating electricity. First and second HRSGs 20, 40 are fluidly connected to power generating section B via the steam turbine 100, separately from the fluid connection to the coal treatment system.

In the present method, a contaminant-containing gas stream O, from a contaminant-containing gas source 130, is continuously introduced into the first HRSG 20. The first HRSG 20 comprises an inlet 22 for receiving the gas stream O at a first temperature $T_1$, and an outlet 24 for discharging gas stream P, at a temperature $T_2$ that is lower than $T_1$, into the primary processing chamber 10. In the first HRSG 20, heat is extracted from gas stream O for later use in energy production, which will be discussed in greater detail below.

Optionally, one or more additional HRSGs (not illustrated) may be used sequentially with the primary HRSG 20 to utilize any residual waste heat from the primary HRSG 20, and the gas stream resulting from any additional HRSGs is discharged into the primary processing chamber 10.

Primary processing chamber 10 is capable of treating gas stream P such that the majority of contaminants and particulates are removed therefrom. Accordingly, primary processing chamber 10 is capable of withstanding the processing conditions (i.e., temperature, pressure, corrosion, and the like), under which such treatment takes place. In certain embodiments, the PPC 10 is configured to produce mixing of the coal feed 75, treatment gas 80 and water 85 to facilitate complete combustion. One exemplary system is a plasma arc centrifugal treatment (PACT) system available from Retech Systems, LLC, in Ukiah, Calif.) comprising one or more non-transferred arc plasma torches fitted with gas backflow collars. Non-transferred arc plasma torches house both electrodes inside the torch, and the plasma extends beyond the end of the torch as a result of high gas flow through the torch, even though the electrodes are inside the torch. For ease of discussion, the terms "torch" or "torches" will be used hereinafter to refer to non-transferred arc plasma torches. FIGS. 11A and 11B are schematic diagrams of a non-transferred mode plasma arc torch, 300, and a transferred mode plasma arc torch 350.

FIG. 11A and FIG. 11B are schematic diagrams of a non-transferred plasma arc torch 300 and a transferred plasma arc torch 350. FIG. 10A shows the front electrode 310, the rear electrode 312, insulator 318, the arc gas supply 320 and the plasma gas 330. FIG. 11B shows the electrode 314, the nozzle 360, insulator 318, the swirl ring 316, the arc gas supply 320 and the plasma gas 330 contacting the melt 370, which is maintained at electrical ground.

According to the present method, the gas stream P is continuously introduced into the primary processing chamber 10, and the treatment gas 80 is simultaneously supplied to primary processing chamber 10 at a predetermined flow rate and concentration, while the torches heat both the gaseous waste stream and the treatment gas contained in the chamber. In primary processing chamber 10, treatment gas 80 can react with certain contaminants in the waste stream to produce a treated gas stream Q from which dioxins, furans, the majority of $NO_x$, and the majority of particulate matter (e.g., ash) suspended in the gas stream P have been removed, and also comprising non-toxic reaction products and/or by-products. For example, during treatment in primary processing chamber 10, CO and $H_2$ are oxidized such that the treated gas stream comprises carbon dioxide ($CO_2$) and water ($H_2O$).

After treatment in primary processing chamber 10, treated gas Q, at temperature $T_3$ is discharged into second HRSG 40. Second HRSG 40 is fluidly connected to the outlet of primary processing chamber 10, and is adapted to receive treated gas stream Q and to discharge the treated gas stream R at a fourth temperature $T_4$, lower than $T_3$, into the quench chamber 50.

In the quench chamber 50, the temperature of the treated gas stream R is further reduced to a temperature sufficiently low to prevent the re-formation of contaminants, and to a suitable range to prevent damage to the wet scrubber 60 and/or baghouse 70. After reduction of the temperature to a suitable range, treated gas S is discharged from quench chamber 50 into the wet scrubber 60. In wet scrubber 60, VOCs, $SO_X$ and remaining particulate matter are removed from treated gas S, and the treated gas U is discharged into baghouse 70, in which the sulfur from the $SO_X$ is collected.

Thereafter, a "clean" gas stream T comprising cooled down $H_2O$ and $CO_2$ is discharged from the system A. The water can then be separated and the $CO_2$ stream can then be isolated for EPA approved sequestration or other approved carbon capture and sequestration (CCS) techniques for $CO_2$ removal in $CO_2$ removal system 120.

Figure 12:
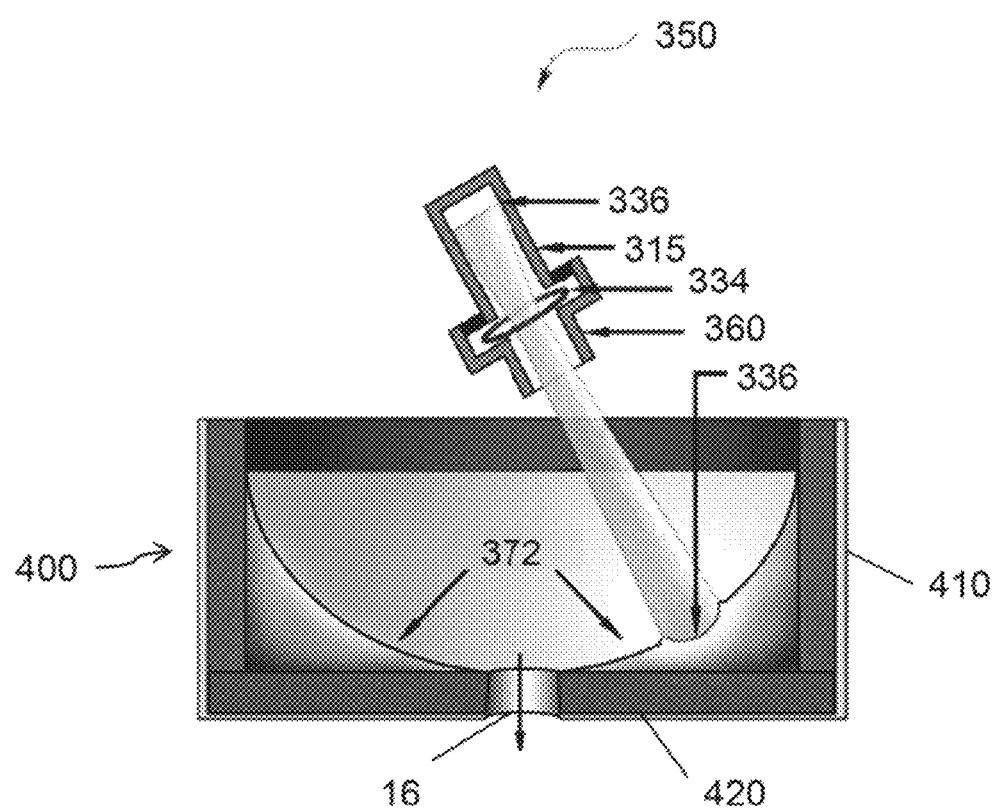
FIG. 12 is a schematic diagram of a processing chamber having a transferred mode plasma arc torch and a centrifuge.

FIG. 12 is a schematic diagram of certain features of an embodiment of a primary processing chamber showing a transferred plasma arc torch 350 and a centrifuge portion 400. The transferred plasma arc torch 350 includes water-cooled electrode 315, nozzle 360, swirling plasma gas 334, and plasma arc terminations 336. The slag bath 372 is held away from the slag exit 16 in the centrifuge floor 420 by the rotation of the centrifuge 400.

Figure 13:
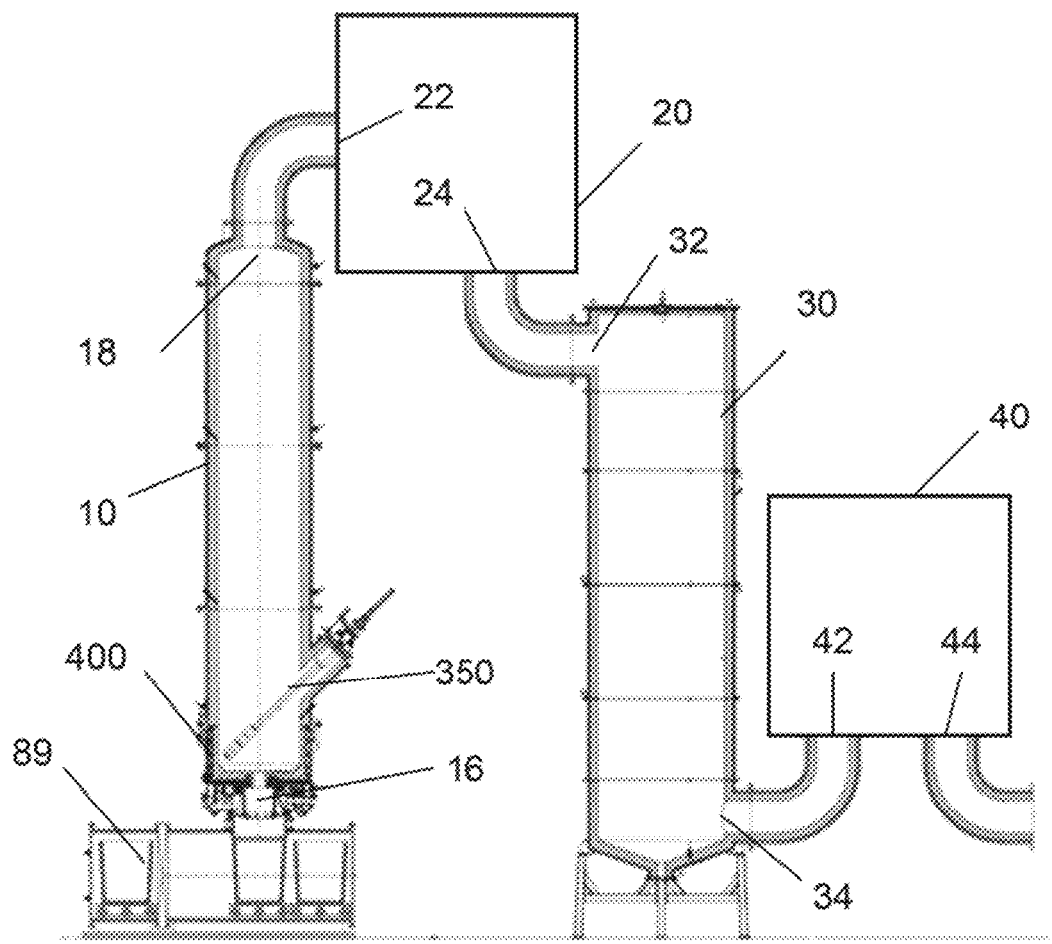
FIG. 13 is a schematic diagram of an embodiment of a vertical processing chamber layout having primary and secondary processing chambers and two HRSGs according to the present disclosure.

FIG. 13 is a diagram of a vertical embodiment showing the primary processing chamber 10 in fluid communication with the first HRSG 20 having inlet 22 and outlet 24, the secondary processing unit 30 having inlet 32 and outlet 34 and the second HRSG 40 having inlet 42 and outlet 44. The primary processing chamber 10 has slag outlet 16, gas outlet 18, a transferred plasma arc torch 350 and a centrifuge portion 400. Slag collection containers 89 can be positioned below the slag outlet 16.

Figure 14A:
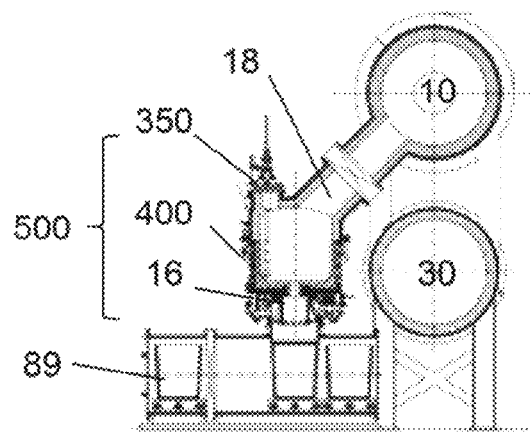
FIGS. 14A, 14B and 14C are schematic diagrams of an embodiment of a horizontal processing chamber layout for primary and secondary processing chambers and two HRSGs according to the present disclosure, showing a cross-section view, FIG. 14A with a modular plasma-arc centrifugal treatment system (PACT), a longitudinal section view, FIG. 14B and cross-section view, FIG. 14C with a plurality of modular PACTs.
Figure 14B:
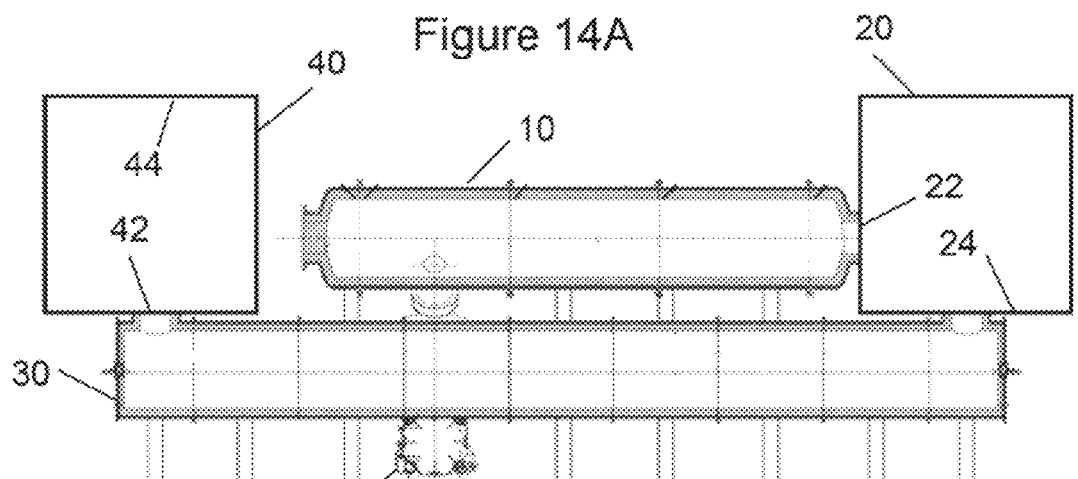
Figure 14C:
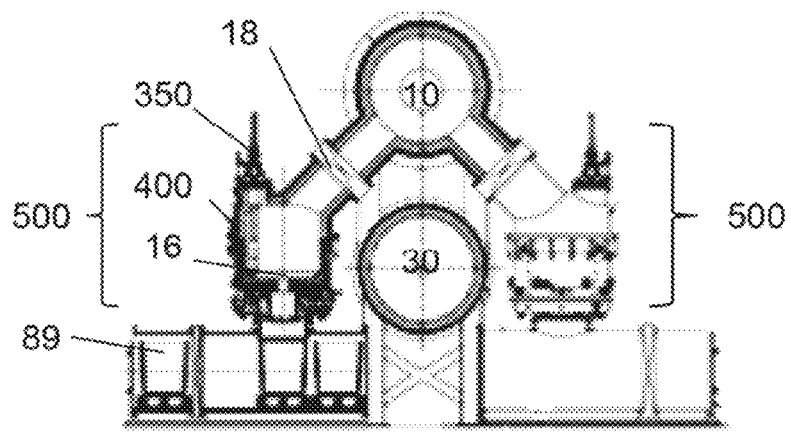

FIGS. 14A, 14B and 14C are schematic diagrams of an embodiment of a horizontal processing chamber layout for primary and secondary processing chambers and two HRSGs according to the present disclosure. FIG. 14A shows a cross-section view with a modular PACT 500 as a region of the primary processing chamber 10; the PACT 500 includes a slag outlet 16, centrifuge portion 400, gas outlet 18, and a transferred plasma arc torch 350. Slag collection containers 89 can be positioned below the slag outlet 16. FIG. 14B is a longitudinal section view showing the primary processing chamber 10 in fluid communication with the first HRSG 20 having inlet 22 and outlet 24, the secondary processing unit 30 having inlet 32 and outlet 34 and the second HRSG 40 having inlet 42 and outlet 44. FIG. 14C is a schematic diagram of a cross-section view showing a primary processing chamber 10 in fluid communication with a plurality of modular PACTs 500.

While the disclosure has been described with reference several exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

Ranges disclosed herein are inclusive and combinable (e.g., ranges of "up to about 25 weight percent (wt. %), with about 5 wt. % to about 20 wt. % desired, and about 10 wt. % to about 15 wt. % more desired," are inclusive of the endpoints and all intermediate values of the ranges, e.g., "about 5 wt. % to about 25 wt. %, about 5 wt. % to about 15 wt. %", etc.). Unless defined otherwise, technical and scientific terms used herein have the same meaning as is commonly understood by one of skill in the art to which this disclosure belongs.

Throughout the application, it should be noted that the terms "first" and "second," "primary" and "secondary," and the like herein, do not denote any order or importance, but rather are used to distinguish one element from another, and the terms "a" and "an" herein do not denote a limitation of quantity, but rather denote the presence of at least one of the referenced items. Similarly, it is noted that the terms "bottom" and "top" are used herein, unless otherwise noted, merely for convenience of description, and are not limited to any one position or spatial orientation. In addition, the modifier "about" used in connection with a quantity is inclusive of the stated value and has the meaning dictated by the context (e.g., includes the degree of error associated with measurement of the particular quantity).

The invention claimed is:
1. A method for generating steam comprising:
providing a continuous supply of a carbonaceous material to a first processing chamber having a first plasma arc torch;
combusting the carbonaceous material in the first processing chamber in the presence of a first treatment gas and water to provide a first product gas stream comprising at least water, an amount of carbon monoxide (CO), an amount of carbon dioxide ($CO_2$), and a molten slag;
controlling a ratio of the amount of CO to the amount of CO plus the amount of $CO_2$ in the first product gas stream to about 20% to about 45%;
collecting the molten slag in a rotating crucible portion of the first processing chamber wherein the crucible portion rotates at a first rate sufficient to maintain, by centrifugal force, the molten slag away from an exit portion of the crucible portion located about at an axis of rotation of the crucible portion;
recovering heat from the first product gas stream in a first heat recovery steam generator to produce a first steam output;
processing the first product gas stream in a second processing chamber having a second plasma arc torch in the presence of a second treatment gas and water to provide a second product gas stream comprising at least carbon dioxide and substantially free of carbon monoxide and hydrogen;
recovering heat from the second product gas stream in a second heat recovery steam generator to produce a second steam output;
directing at least a portion of the second product gas stream carbon dioxide to the first processing chamber;
directing at least a portion of the water to the first processing chamber; and slowing the crucible portion rotation to a second rate thereby allowing the molten slag to exit the crucible portion through the exit portion of the crucible portion, wherein each of the first plasma torch and the second plasma torch generates heat at a temperature in a range of about 5540° C. to about 11,080° C.;

wherein the carbon dioxide is directed to the first processing chamber via a first programmable valve having a first control mechanism; and, wherein the water is directed to the first processing chamber via a second programmable valve having a second control mechanism.

2. The method of claim 1 further comprising, processing the second stream output in a wet scrubber to provide a wet scrubber output.

3. The method of claim 2, wherein the wet scrubber output comprises at least water and carbon dioxide.

4. The method of claim 2 further comprising:
providing a plurality of monitors each configured to measure at least one of a plurality of process parameters and provide data thereof to a processor; and
controlling the first control mechanism and the second control mechanism by the processor, based at least in part on the data provided by the plurality of monitors.

5. The method of claim 4, wherein the plurality of process parameters measured by the monitors comprise at least one of temperature, pressure, carbon dioxide composition, water volume, and gas flow.

6. The method of claim 4, wherein the plurality of monitors measure the process parameters in at least one of the first processing chamber, the first product gas stream, the first heat recovery steam generator, the first steam output, the second processing chamber, the second product gas stream, and the second stream output.

* * * * *